United States Patent
Wishneusky et al.

(10) Patent No.: US 7,522,620 B2
(45) Date of Patent: Apr. 21, 2009

(54) METHOD AND APPARATUS FOR SCHEDULING PACKETS

(75) Inventors: John Wishneusky, Fitzwilliam, NH (US); Sanjeev Jain, Shrewsbury, MA (US); David Romano, Cumberland, RI (US)

(73) Assignee: Intel Corporation, Santa Clara, CA (US)

( * ) Notice: Subject to any disclaimer, the term of this patent is extended or adjusted under 35 U.S.C. 154(b) by 1278 days.

(21) Appl. No.: 10/640,206

(22) Filed: Aug. 12, 2003

(65) Prior Publication Data

US 2005/0036495 A1 Feb. 17, 2005

(51) Int. Cl.
*H04L 12/56* (2006.01)
(52) U.S. Cl. ........................ 370/412; 370/429
(58) Field of Classification Search ................ 370/400, 370/401, 412–418, 428, 429; 709/223–226
See application file for complete search history.

(56) References Cited

U.S. PATENT DOCUMENTS

| | | | |
|---|---|---|---|
| 5,392,280 A | 2/1995 | Zheng | |
| 6,389,017 B1 | 5/2002 | Patel et al. | |
| 6,470,016 B1 | 10/2002 | Kalkunte et al. | |
| 6,862,265 B1* | 3/2005 | Appala et al. | 370/235 |
| 6,891,835 B2* | 5/2005 | Kalkunte et al. | 370/395.41 |
| 6,914,881 B1* | 7/2005 | Mansfield et al. | 370/230 |
| 6,917,591 B2* | 7/2005 | St. John | 370/235 |
| 6,940,861 B2* | 9/2005 | Liu et al. | 370/395.21 |
| 7,027,414 B2* | 4/2006 | Walsh et al. | 370/316 |
| 7,085,247 B2* | 8/2006 | Schweinhart et al. | 370/316 |
| 7,324,536 B1* | 1/2008 | Holtey et al. | 370/412 |
| 7,373,420 B1* | 5/2008 | Lyon | 709/235 |
| 2002/0012341 A1 | 1/2002 | Battle et al. | |
| 2002/0064161 A1 | 5/2002 | Kim | |

OTHER PUBLICATIONS

M. Shreedhar et al., "Efficient Fair Queuing Using Deficit Round Robin", ACM SigComm'95, Cambridge, MA, 1995, pp. 14.

* cited by examiner

*Primary Examiner*—Wing F Chan
*Assistant Examiner*—Duc T Duong
(74) *Attorney, Agent, or Firm*—Caven & Aghevli LLC

(57) ABSTRACT

A method and apparatus for scheduling packets using a pre-sort deficit round-robin method. Scheduling decisions for packets are made when packets are received, and entries for the received packets are stored in a pre-sorted scheduling array. A packet is transmitted by dequeuing the packet from the pre-sorted scheduling array.

48 Claims, 14 Drawing Sheets

METHOD AND APPARATUS FOR SCHEDULING PACKETS

FIELD OF THE INVENTION

The invention relates generally to computer networking and, more particularly, to a method and apparatus for scheduling packets.

BACKGROUND OF THE INVENTION

A network switch (or router or other packet forwarding or data generating device) may receive packets or other communications at rates exceeding hundreds, if not thousands, of packets per second. To insure a fair allocation of network resources (e.g., bandwidth), or to insure that resources are allocated in accordance with a desired policy, a network switch typically implements some type of packet transmission mechanism that determines when packets are selected for transmission. A conventional packet transmission mechanism will generally attempt to allocate bandwidth amongst all packet flows in a consistent manner, while preventing any one source from usurping too large a share—or an unauthorized share—of the network resources (e.g., by transmitting at a high data rate and/or by transmitting packets of relatively large size).

A typical network switch includes a number of packet queues, wherein each queue is associated with a specific flow or class of packet flows. As used herein, a "flow" is a series of packets that share at least some common header characteristics (e.g., packets flowing between two specific addresses). When packets arrive at the switch, the flow to which the packet belongs is identified (e.g., by accessing the packet's header data), and the packet (or a pointer to a location of the packet in a memory buffer) is stored in the corresponding queue. Enqueued packets are then selected for transmission according to a desired policy. For example, a number of queues may be serviced one-by-one in a round-robin manner; however, such a simple round-robin transmission scheme does not take into account packet size, and a source of packets could acquire bandwidth by simply transmitting packets of a large size.

To overcome the deficiencies of the simple round-robin method described above, a method known as "deficit round-robin" has been proposed. In a deficit round-robin packet transmission scheme, a number of packet queues are serviced one by one in a round-robin manner, wherein one pass through each active queue (i.e., a non-empty queue) is referred to as a "round." For each round, a queue is allocated a quantum of bandwidth, which may be expressed as a specified quantity of data (e.g., 256 bytes). The quantums for a number of queues (or packet flows) may be the same or, alternatively, a set of queues may have different quantums (e.g., to implement quality of service or other resource reservation schemes). Also, a "deficit count" is maintained for each queue, and the deficit count for a queue during any given round is equal to the sum of any remaining deficit count from the preceding round plus the quantum for that queue. Accordingly, the usable bandwidth by a queue during a round is the current value of the deficit count (i.e., the prior deficit count plus the quantum).

When a queue is serviced during a round, the packet at the head of the queue is accessed to determine the packet's size, and if the packet's size is less than or equal to the current deficit count, the packet is dequeued for transmission. The size of the dequeued packet is subtracted from the deficit count, and if the updated value of the deficit count is greater than or equal to the next packet in that queue (if any), the next packet is also dequeued for transmission and the deficit count again updated. So long as a queue has remaining bandwidth in the current round—as determined by the queue's deficit count—the queue may continue to dequeue packets for transmission. Conversely, if the packet at the head of the queue (or any subsequent packet, if the lead packet has already been dequeued) has a size exceeding the current deficit count of the queue—i.e., the queue has utilized its allocated bandwidth in the current round—a packet (or an additional packet) is not dequeued from this queue during the current round. However, the queue's unutilized bandwidth, as expressed by the queue's deficit count, is carried over to the next round. An example of the above-described deficit round-robin method is presented in M. Shreedhar et al., *Efficient Fair Queuing Using Deficit Round Robin*, Proceedings ACM SIGCOMM, pp. 231-242, 1995.

The deficit round-robin (DRR) method does provide for the fair transmission of packets. Sources who attempt to transmit at high rates and/or with relatively large packet sizes are not allowed to obtain more bandwidth (as expressed by a quantum value) than has been allocated for that flow of packets. Deficit round-robin methods can, however, be inefficient and unsuitable for high performance switches. More specifically, as noted above, during each round, each active queue is examined to determine whether a packet can be dequeued for transmission, but it is not known a priori whether a packet can be dequeued from any given queue. Thus, a certain amount of computational work may be performed without achieving the desired outcome, which is the transmission of a packet (or the dequeuing of a packet for transmission). This loss of computational work may be negligible for low speed applications; however, this inefficiency may be intolerable for high performance applications where high throughput is desired.

DETAILED DESCRIPTION OF THE INVENTION

Embodiments of a packet scheduler are disclosed herein. The disclosed embodiments of the packet scheduler are described below in the context of a network switch. However, it should be understood that the disclosed embodiments are not so limited in application and, further, that the embodiments of a packet scheduler described in the following text and figures are generally applicable to any device, system, and/or circumstance where scheduling of packets or other communications is needed. For example, the disclosed embodiments may find application in a switch on a high speed backplane fabric.

Figure 1:
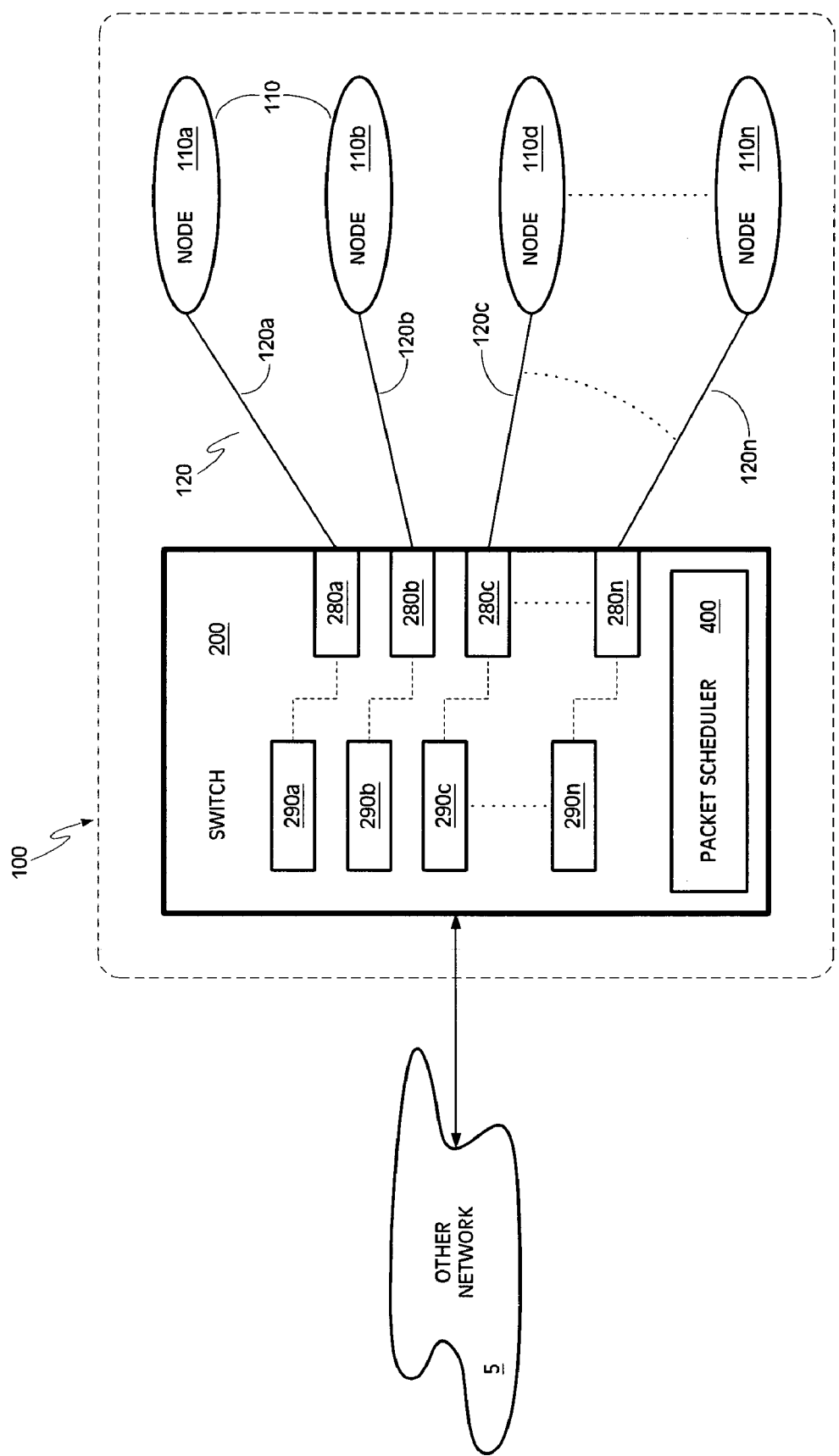
FIG. 1 is a schematic diagram illustrating an embodiment of a network having a switch including a packet scheduler.

Illustrated in FIG. 1 is an embodiment of a network 100. The network 100 includes a switch 200 having a number of ports, including ports 280a, 280b, . . . , 280n. Associated with each of the ports 280a-n is a set of queues (i.e., port 280a is associated with queues 290a, port 280b is associated with queues 290b, and so on). Each of the switch ports 280a-n may be coupled with a node (or nodes) 110 via a corresponding link 120 (i.e., port 280a is coupled with node 110a via link 120a, and so on). A node 110 comprises any addressable device. For example, a node 110 may comprise a computer system or other computing device—such as a server, a desktop computer, a laptop computer, or a hand-held computing device (e.g., a personal digital assistant or PDA)—or a node 110 may comprise another switch coupled with other nodes (e.g., a collection of other nodes comprising a subnet). Each of the links 120a-n may be established over any suitable medium—e.g., wireless, copper wire, fiber optic, or a combination thereof-using any suitable protocol—e.g., TCP/IP (Transmission Control Protocol/Internet Protocol), HTTP (Hyper-Text Transmission Protocol), as well as others.

The network 100 may comprise any type of network, such as a Local Area Network (LAN), a Metropolitan Area Network (MAN), a Wide Area Network (WAN), a Wireless LAN (WLAN), or other network. The switch 200 also couples the network 100 with another network (or networks) 5, such as, by way of example, the Internet and/or another LAN, MAN, LAN, or WLAN. Switch 200 may be coupled with the other network 5 via any suitable medium, including a wireless, copper wire, and/or fiber optic connection using any suitable protocol (e.g., TCP/IP, HTTP, etc.).

The switch 200 receives communications (e.g., packets, frames, cells, etc.) from other network(s) 5 and routes those communications to the appropriate node 100, and the switch 200 also receives communications from the nodes 110a-n and transmits these communications out to the other network(s) 5. Generally, a communication will be referred to herein as a "packet"; however, it should be understood that the disclosed embodiments are applicable to any type of communication, irrespective of format or content. To schedule a packet for transmission, whether the packet is addressed to a node in another network 5 or is destined for one of the nodes 110a-n in network 100, the switch 200 includes a packet scheduler 400. The packet scheduler 400 implements what is referred to herein as a "pre-sort deficit round-robin" scheduling method, and various embodiments of this packet scheduler are described below in greater detail.

The switch 200 may be implemented on any suitable computing system or device (or combination of devices), and one embodiment of the switch 200 is described below with respect to FIG. 2A and the accompanying text. However, although the disclosed embodiments are explained below in the context of a switching device, it should be understood that the disclosed embodiments of a packet scheduler may be implemented on any device that routes, generates, forwards, or otherwise manipulates communications between two or more devices (e.g., communications between two nodes interconnected by a computer network, or communications between two devices interconnected by a high speed backplane fabric, etc.).

It should be understood that the network 100 shown in FIG. 1 is intended to represent an exemplary embodiment of such a system and, further, that the network 100 may have any suitable configuration. For example, the network 100 may include additional nodes 110, as well as other networking devices (e.g., routers, hubs, gateways, etc.), which have been omitted from FIG. 1 for ease of understanding. Further, it should be understood that the network 100 may not include all of the components illustrated in FIG. 1.

In one embodiment, the switch 200 comprises any suitable computing device, and the packet scheduler 400 comprises a software application that may be implemented or executed on this computing device. An embodiment of such a switch is illustrated in FIG. 2A.

Figure 2A:
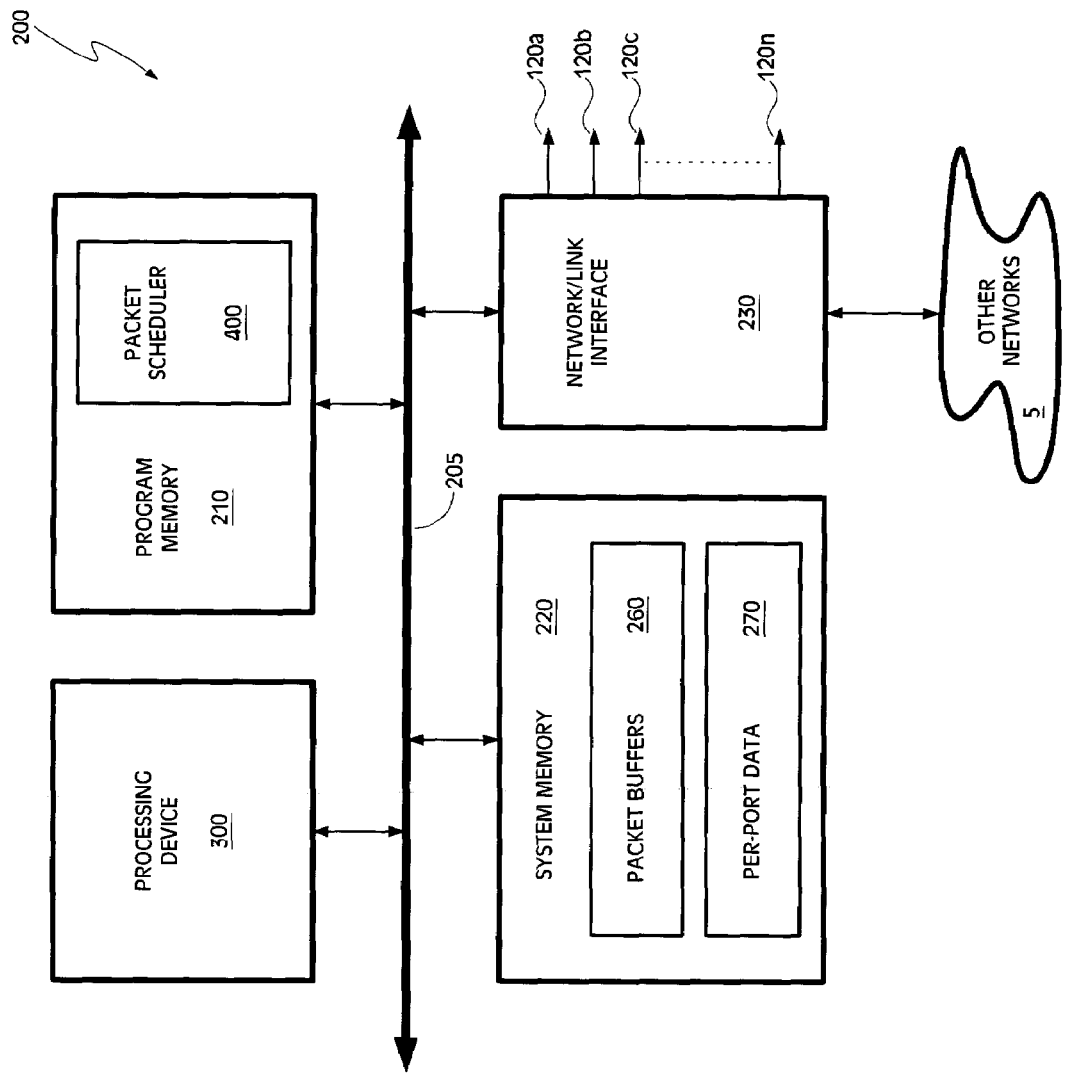
FIG. 2A is a schematic diagram illustrating an embodiment of the switch shown in FIG. 1.

Referring to FIG. 2A, the switch 200 includes a bus 205 to which various components are coupled. Bus 205 is intended to represent a collection of one or more buses—e.g., a system bus, a Peripheral Component Interface (PCI) bus, a Small Computer System Interface (SCSI) bus, etc.—that interconnect the components of switch 200. Representation of these buses as a single bus 205 is provided for ease of understanding, and it should be understood that the switch 200 is not so limited. Those of ordinary skill in the art will appreciate that the switch 200 may have any suitable bus architecture and may include any number and combination of buses.

Coupled with bus 205 is a processing device (or devices) 300. The processing device 300 may comprise any suitable processing device or system, including a microprocessor, a network processor, an application specific integrated circuit (ASIC), or a field programmable gate array (FPGA), or similar device. An embodiment of the processing device 300 is illustrated below in FIG. 3 and the accompanying text.

Also coupled with the bus 205 is program memory 210. Where the packet scheduler 400 is implemented as a software routine comprising a set of instructions, these instructions may be stored in the program memory 210. Upon system initialization and/or power up, the instructions may be transferred to on-chip memory of the processing device 300, where they are stored for execution on the processing device. The program memory may comprise any suitable non-volatile memory. In one embodiment, the program memory 210 comprises a read-only memory (ROM) device or a flash memory device. In another embodiment, the switch 200 further includes a hard-disk drive (not shown in figures) upon which the packet scheduler software may be stored. In yet another embodiment, the switch 200 also includes a device (not shown in figures) for accessing removable storage media—e.g., a floppy-disk drive, a CD-ROM drive, and the like—and the packet scheduler software is downloaded from a removable storage media into memory of the processing device 300 (or downloaded into the program memory 210). In yet a further embodiment, upon power up or initialization of the switch 200, the packet scheduler software is downloaded from one of the nodes 110a-n or from another network 5 and stored in memory of the processing device 300 (in which case, program memory 210 may not be needed).

Switch 200 also includes system memory 220, which is coupled with bus 205. The system memory 210 may comprise any suitable type and/or number of memory devices. For example, the system memory 210 may comprise a DRAM (dynamic random access memory), a SDRAM (synchronous DRAM), a DDRDRAM (double data rate DRAM), and/or a SRAM (static random access memory), as well as any other suitable type of memory. During operation of switch 200, the system memory 220 provides one or more packet buffers 280 to store packets received from another network 5 and/or that have been received from the nodes 110*a-n*. Also, the system memory 220 stores per-port data 270, which is described below in more detail with respect to FIG. 2B and the accompanying text. In one embodiment, the packet buffers 280 are stored in a DRAM device (or SDRAM or DDRDRAM), and the per-port data 270 is stored in a SRAM device. In other embodiments, however, the per-port data 270 may be stored in other suitable memory (e.g., DRAM, SDRAM, DDRDRAM, etc.).

The switch 200 further comprises a network/link interface 230 coupled with bus 205. The network/link interface 230 comprises any suitable hardware, software, or combination of hardware and software that is capable of coupling the switch 200 with the other network (or networks) 5 and, further, that is capable of coupling the switch 200 with each of the links 120*a-n*.

It should be understood that the switch 200 illustrated in FIG. 2A is intended to represent an exemplary embodiment of such a device and, further, that this switch may include many additional components, which have been omitted for clarity and ease of understanding. By way of example, the switch 200 may include a chip set associated with the processing device 300, additional memory (e.g., a cache memory), one or more input devices (e.g., a keyboard, a pointing device such as a mouse, and a scanner or other data entry device), one or more output devices (e.g., a video monitor or an audio output device), as well as additional signal lines and buses. The switch 200 may also include a hard-disk drive and/or a device for accessing removable storage media, both as noted above. Also, it should be understood that the switch 200 may not include all of the components shown in FIG. 2A.

Figure 2B:
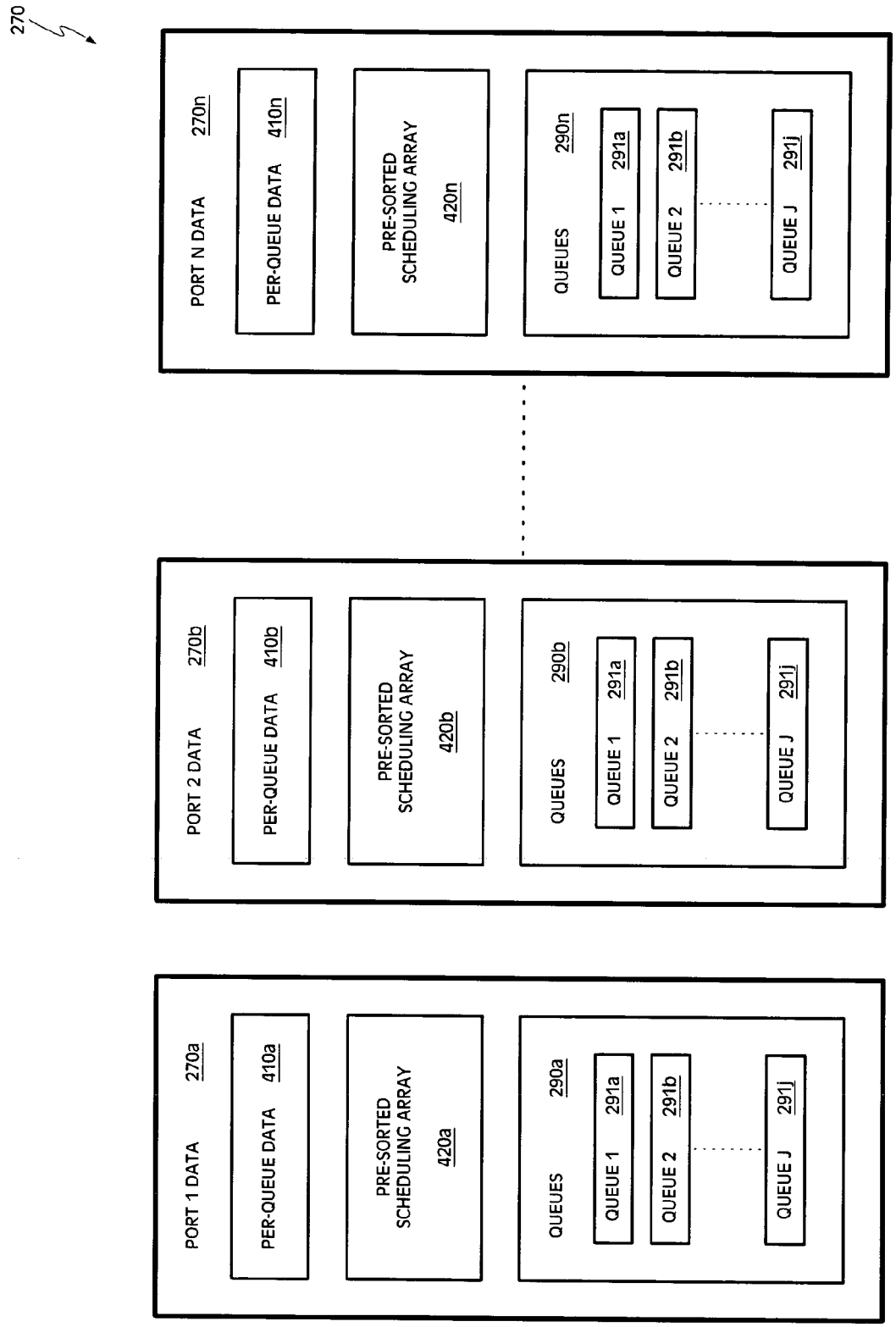
FIG. 2B is a schematic diagram illustrating an embodiment of per-port data maintained by the switch of FIG. 2A.

Turning now to FIG. 2B, the per-port data 270 is illustrated in greater detail. Per-port data 270 includes data associated with each of the ports 280*a-n* (i.e., per-port data 270*a* is maintained for port 280*a*, per-port data 270*b* is maintained for port 280*b*, and so on). For each port 280*a-n*, a number of queues are provided, as previously described (e.g., for port 280*a*, per-port data 270*a* includes a set of queues 290*a* comprising queues 291*a*, 291*b*, . . . , 291*j*). Each of the packet queues 291*a-j* is associated with a specified flow of packets or a group of packet flows (e.g., those flows having the same class of service, those flows that map to the same queue based upon a hashing scheme, etc.). Any suitable number of queues 291*a-j* may be associated with each of the ports 280*a-n* and, although illustrated as having the same number of queues 291*a-j*, it should be understood that the ports 280*a-n* may not have equal numbers of associated queues 291*a-j*. A queue may store pointers to packets stored in the packet buffers 280 (i.e., packets that correspond to the specified packet flow or flows).

The per-port data for any given port also includes two data structures maintained by the packet scheduler 400: per queue data and a pre-sorted scheduling array (e.g., per-port data 270*a* for port 280*a* includes per-queue data 410*a* and pre-sorted scheduling array 420*a*, and so on). The per queue data 410*a-n* and pre-sorted scheduling arrays 420*a-n* will be described in greater detail below.

Figure 3:
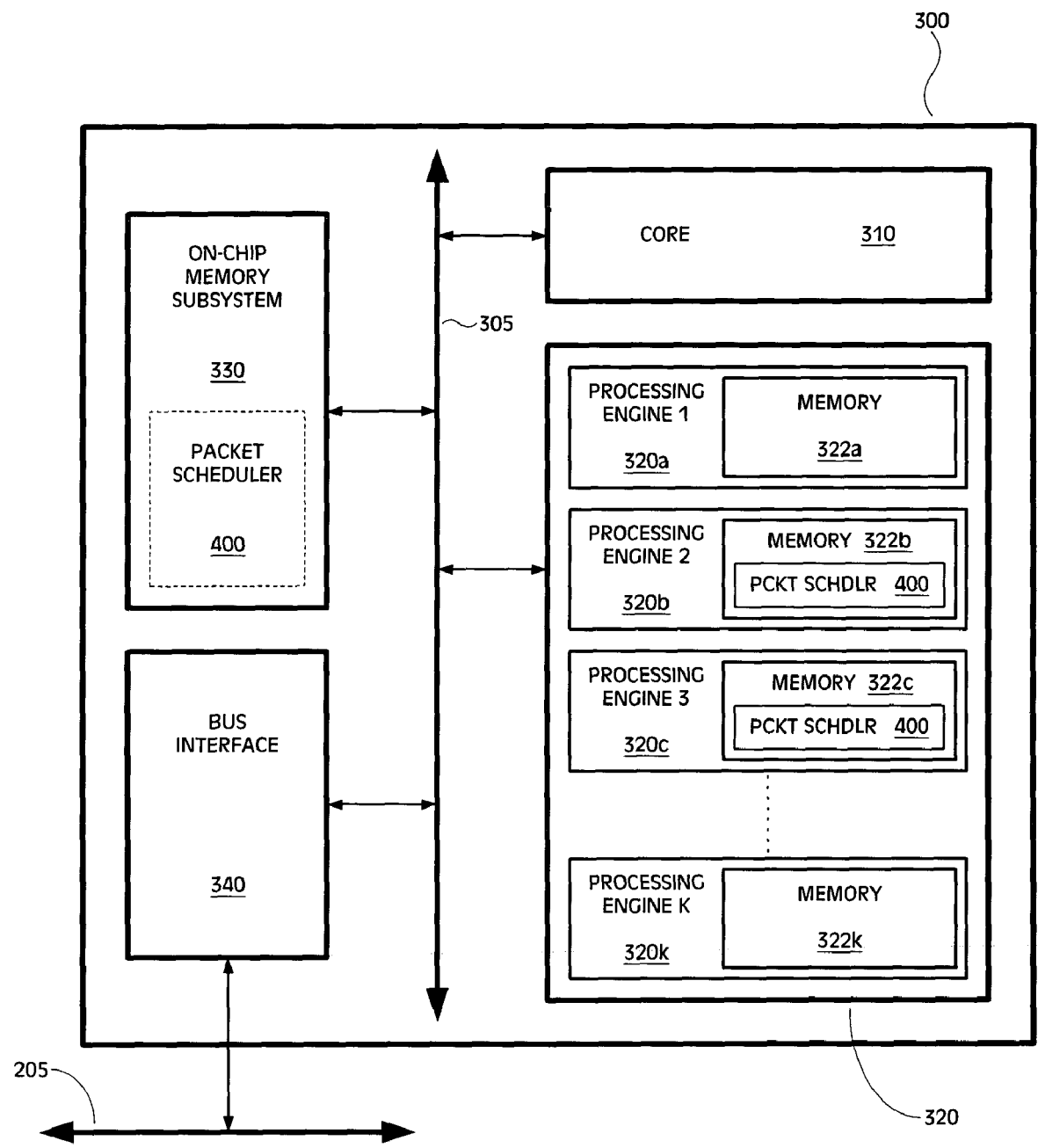
FIG. 3 is a schematic diagram illustrating an embodiment of a processing device shown in the switch of FIG. 2A.

As previously noted, an embodiment of processing device 300 is illustrated in FIG. 3 and the accompanying text. It should be understood, however, that the processing device 300 shown in FIG. 3 is but one embodiment of a processing device upon which the disclosed embodiments of a packet scheduler 400 may be implemented. Those of ordinary skill in the art will appreciate that the disclosed embodiments of packet scheduler 400 may be implemented on many other types of processing systems and/or processor architectures.

Turning now to FIG. 3, the processing device 300 includes a local bus 305 to which various functional units are coupled. Bus 305 is intended to represent a collection of one or more on-chip buses that interconnect the various functional units of processing device 300. Representation of these local buses as a single bus 305 is provided for ease of understanding, and it should be understood that the processing device 300 is not so limited. Those of ordinary skill in the art will appreciate that the processing device 300 may have any suitable bus architecture and may include any number and combination of buses.

A core 310 and a number of processing engines 320 (e.g., processing engines 320*a*, 320*b*, . . . , 320*k*) are coupled with the local bus 305. In one embodiment, the core 310 comprises a general purpose processing system. Core 310 may execute an operating system and control operation of processing device 300, and the core 310 may also perform a variety of management functions, such as dispensing instructions to the processing engines 320 for execution.

Each of the processing engines 320*a-k* comprises any suitable processing system, and each may include an arithmetic and logic unit (ALU), a controller, and a number of registers (for storing data during read/write operations). Each processing engine 320*a-k* may, in one embodiment, provide for multiple threads of execution (e.g., four). Also, each of the processing engines 320*a-k* may include a memory (i.e., processing engine 320*a* includes memory 322*a*, processing engine 320*b* includes memory 322*b*, and so on). The memory 322*a-k* of each processing engine 320*a-k* can be used to store instructions for execution on that processing engine. In one embodiment, one or more of the processing engines (e.g., processing engines 320*b*, 320*c*) stores instructions associated with the packet scheduler 400 (or instructions associated with certain components of the packet scheduler 400). The memory 322*a-k* of each processing engine 320*a-k* may comprise SRAM, ROM, EPROM (Erasable Programmable Read-Only Memory), or some type of flash memory (e.g., flash ROM). Further, although illustrated as discrete memories associated with a specific processing engine, it should be understood that, in an alternative embodiment, a single memory (or group of memories) may be shared by two or more of the processing engines 320*a-k* (e.g., by a time-division multiplexing scheme, etc.).

Also coupled with the local bus 305 is an on-chip memory subsystem 330. Although depicted as a single unit, it should be understood that the on-chip memory subsystem 330 may—and, in practice, likely does—comprise a number of distinct memory units and/or memory types. For example, such on-chip memory may include SRAM, SDRAM, DDRDRAM, and/or flash memory (e.g., flash ROM). It should be understood that, in addition to on-chip memory, the processing device 300 may be coupled with off-chip memory (e.g., system memory 220, off-chip cache memory, etc.). As noted above, in one embodiment, the packet scheduler 400 is stored in the memory of one or more of the processing engines 320*a-k*. However, in another embodiment, a set of instructions associated with the packet scheduler 400 may be stored in the on-chip memory subsystem 330 (shown in dashed line in FIG. 3).

Processing device 300 further includes a bus interface 340 coupled with local bus 305. Bus interface 340 provides an interface with other components of switch 200, including bus 205. For simplicity, bus interface 340 is depicted as a single functional unit; however, it should be understood that, in practice, the processing device 300 may include multiple bus interfaces. For example, the processing device 300 may include a PCI bus interface, an IX (Internet Exchange) bus interface, as well as others, and the bus interface 340 is intended to represent a collection of one or more such interfaces.

It should be understood that the embodiment of processing device 300 illustrated and described with respect to FIG. 3 is but one example of a processing device that may find use with the disclosed embodiments of a packet scheduler and, further, that the processing device 300 may have other components in addition to those shown in FIG. 3, which components have been omitted for clarity and ease of understanding. For example, the processing device 300 may include other functional units (e.g., an instruction decoder unit, an address translation unit, etc.), a thermal management system, clock circuitry, additional memory, and registers. Also, it should be understood that a processing device may not include all of the elements shown in FIG. 3.

Figure 4:
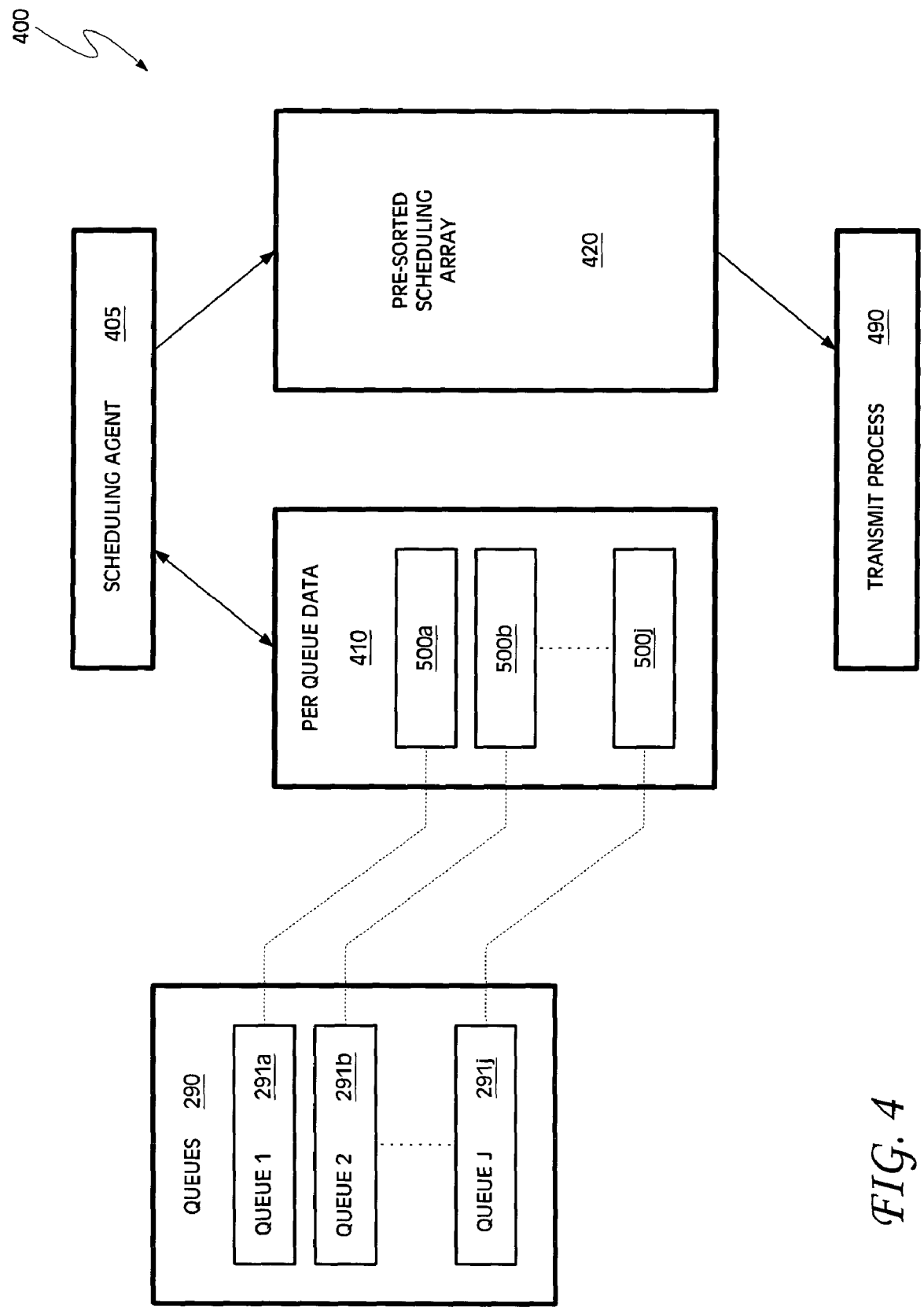
FIG. 4 is a schematic diagram illustrating one embodiment of the packet scheduler shown in FIGS. 1-3.

An embodiment of the packet scheduler 400 is illustrated in FIG. 4. The packet scheduler 400 can schedule packets for transmission as the packets are enqueued, and the packet scheduler 400 can also dequeue packets for transmission. An embodiment of a method 700 for scheduling packets is illustrated and described with respect to FIG. 7, and an embodiment of a method 900 of dequeuing packets is illustrated and described with respect to FIG. 9. Also, an embodiment of a method 800 of determining a transmission round, as may be performed by the packet scheduler 400, is illustrated in FIG. 8 and the accompanying text.

Turning now to FIG. 4, the packet scheduler 400 includes the per-queue data 410 and the pre-sorted scheduling arrays 420 associated with each of the ports 280, as set forth above. Again, the per-queue data 410 for each port is associated with a set of queues 290 for that port, as illustrated in FIG. 4. Per-queue data 410 includes data 500 for each of the individual queues 291*a-j* of the set of queues 290 (i.e., per-queue data 500*a* is associated with queue 291*a*, per-queue data 500*b* is associated with queue 291*b*, and so on). Packet scheduler 400 also includes a scheduling agent 405 to schedule received packets for transmission, as will be described in greater detail below with respect to FIGS. 7 through 9. The scheduling agent 405 schedules packets for transmission based on the notion of "rounds", as with conventional deficit round-robin (DRR) schemes. However, in contrast to conventional DRR methods, the scheduling agent 405 may make scheduling decisions when packets are enqueued, and entries for scheduled packets are placed into the pre-sorted scheduling arrays 420. By forecasting scheduling decisions into the future, transmit scheduling is simply a matter of dequeuing previously scheduled packets from the pre-sorted scheduling arrays 420, and the computational waste associated with analyzing a queue that does not possess the necessary bandwidth allocation during any given round is eliminated. When a packet is dequeued from the pre-sorted scheduling array 420, the packet is passed to a transmit process 490 for transmission.

Figure 5:
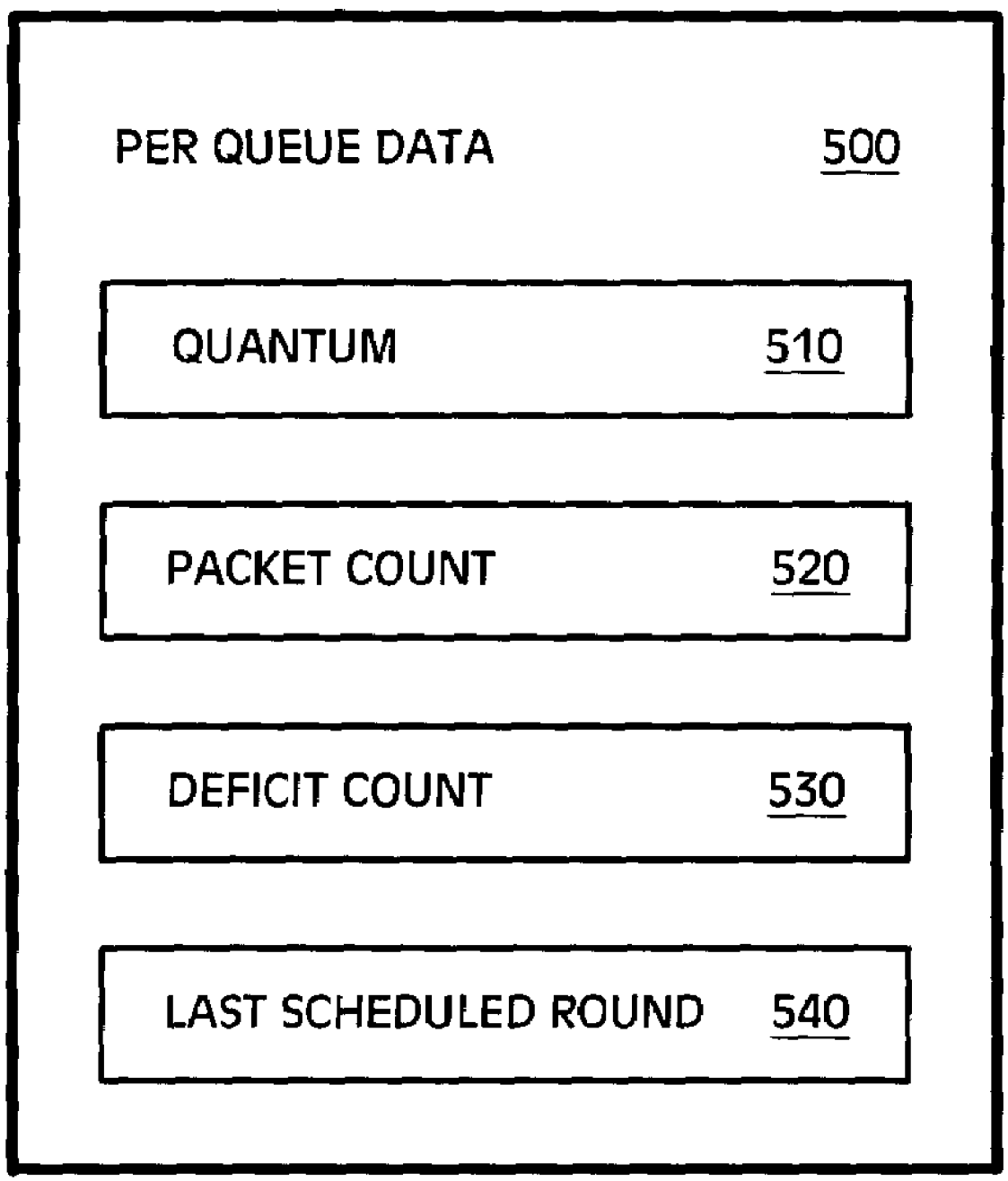
FIG. 5 is a schematic diagram further illustrating the packet scheduler shown in FIG. 4.

Referring to FIG. 5, the per-queue data 500 for a single queue is illustrated. The per-queue data 500 includes a quantum 510, a packet count 520, a deficit count 530, and a last scheduled round 540. The quantum 510 is a per-queue constant that represents the bandwidth (expressed, for example, as a number of bytes) allocated to a queue per scheduling round. The quantum 510 for all queues may be the same or, as part of a quality of service or resource reservation scheme, the quantum 510 may be different for the various queues. Because the quantum may be set to a value that is larger than the minimum packet size, multiple packets associated with the same flow may be scheduled for transmission in the same scheduling round.

The packet count 520 represents the number of packets in that queue. The packet count 520 for a given queue is incremented when a packet is enqueued in the queue, and the packet count is decremented when a packet is dequeued therefrom.

The deficit count 530 represents the unused "transmission credit" that a populated queue possesses. During any round, the deficit count equals the remaining deficit count from the prior round plus the quantum for that queue. The number of packets scheduled for a queue during any given round cannot exceed the current deficit count for that queue (in other words, the number of packets cannot exceed the queue's allocated bandwidth). When a queue becomes empty (i.e., its packet count is zero), the deficit count 530 may be set to zero. However, in another embodiment, the deficit count is not reset to zero when a queue is emptied, and that queue is allowed to hold onto its unused transmission credit for a future packet.

The last scheduled round 540 for a queue is a number representing the round for which the packet at the end of that queue has been scheduled for transmission. As will be explained in more detail below, the scheduling round for a packet being enqueued to a non-empty queue is based on the last scheduled round 540 for that queue. If a packet is being enqueued to an empty queue, the scheduling round for the packet is based on a "current round" maintained by the scheduling agent 405.

Figure 6:
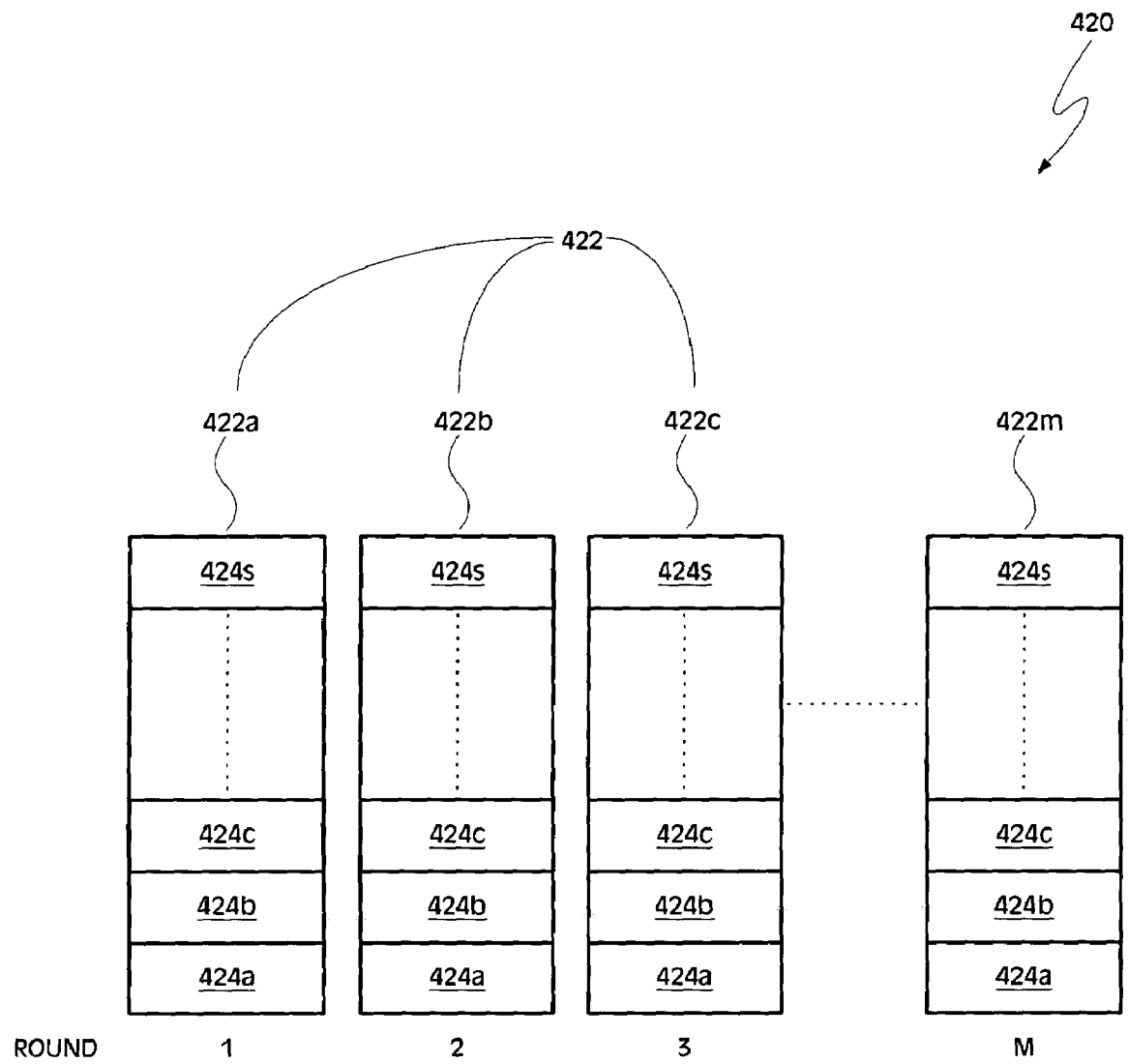
FIG. 6 is a schematic diagram further illustrating the packet scheduler shown in FIG. 4.

An embodiment of a pre-sorted scheduling array 420 is shown in FIG. 6. The pre-sorted scheduling array 420 includes a number of memory buffers 422, including buffers 422*a*, 422*b*, . . . , 422*m*. Each of the buffer 422*a-m* corresponds to a scheduling round (i.e., rounds 1, 2, . . . , M). The number of rounds M—and, hence, the number of buffers 422*a-m*—is generally a function of the throughput of the ports 280*a-n*. Where the ingress rate and egress rate at a port are approximately the same, the number of rounds may be low; however, as the expected backlog in the queues of a port increases, the number of scheduling rounds also increases. In one embodiment, each of the memory buffers 422*a-m* comprises a FIFO (first-in-first-out) buffer capable of storing a number of entries 424*a*, 424*b*, . . . , 424*s*. Each of the entries 424*a-s* may store a pointer or other identifier to a packet that has been scheduled for transmission. Thus, during operation of the switch 200 and packet scheduler 400, each buffer 422*a-m* of the pre-sorted scheduling array 420 associated with a port will include a list of one or more (or none) packets that have been scheduled for transmission in the round corresponding to that buffer.

In one embodiment, the packet scheduler 400 of FIGS. 4 through 6 comprises a set of instructions (i.e., a software application) run on a computing device—e.g., the switch architecture illustrated in FIG. 2A or other suitable computing device—as noted above. The set of instructions may be stored locally in program memory 210 or, in another embodiment, the instructions may be stored in a remote storage device (e.g., one of the nodes 110*a-n*) and accessed via network 100 (or from another network 5). The set of instructions is downloaded from the program memory, or the remote storage media, and stored on the processing device 300 for execution. In a further embodiment, the packet scheduler 400 comprises a set of instructions stored on a machine accessible medium, such as, for example, a magnetic media (e.g., a floppy disk or magnetic tape), an optically accessible disk (e.g., a CD-ROM disk), a flash memory device, etc. To run packet scheduler 400 on switch 200, a device for accessing removable storage media may access the instructions on the machine accessible medium, and the instructions may then be downloaded to processing device 300 and executed.

Upon system initialization and/or power up, the set of instructions of packet scheduler 400 may be downloaded to and stored in the memory 322a-k of one of the processing engines 320a-k for execution in that processing engine. Alternatively, the set of instructions may be downloaded to the memories of two or more of the processing engines 320a-k. Where multiple processing engines 320 are utilized to run packet scheduler 400, each of the multiple processing engines 320 may independently perform packet scheduling or, alternatively, the components of packet scheduler 400 may be spread across the multiple processing engines 320, which function together to perform packet scheduling. As noted above, the packet scheduler 400 may also be downloaded to and stored in an on-chip memory subsystem 330 of processing device 300. For a processing device having multiple processing engines, as shown in FIG. 3, packet scheduling operations may be performed in parallel with other functions (e.g., routing, security, error detection, etc.). Where multiple processing engines execute packet scheduler 400, packet scheduling for multiple ports may also be performed in parallel. In addition, for a processing device having one or more multi-threaded processing engines, this multi-threaded functionality may allow packet scheduling activities for multiple ports to be conducted in parallel. Although many of the above-described embodiments make use of the processing device 300 of FIG. 3, which includes a number of processing engines 320a-k, each of which may be capable of multi-threaded operation, it should be understood that the disclosed embodiments of packet scheduler 400 are not limited to execution on such a processing device and, further, that the packet scheduler software 400 may be executed on any suitable processing device.

In yet a further embodiment, the packet scheduler 400 is implemented in hardware or a combination of hardware and software (e.g., firmware). For example, the packet scheduler 400 may be implemented in an ASIC, an FPGA, or other similar device that has been programmed in accordance with the disclosed embodiments.

Figure 7:
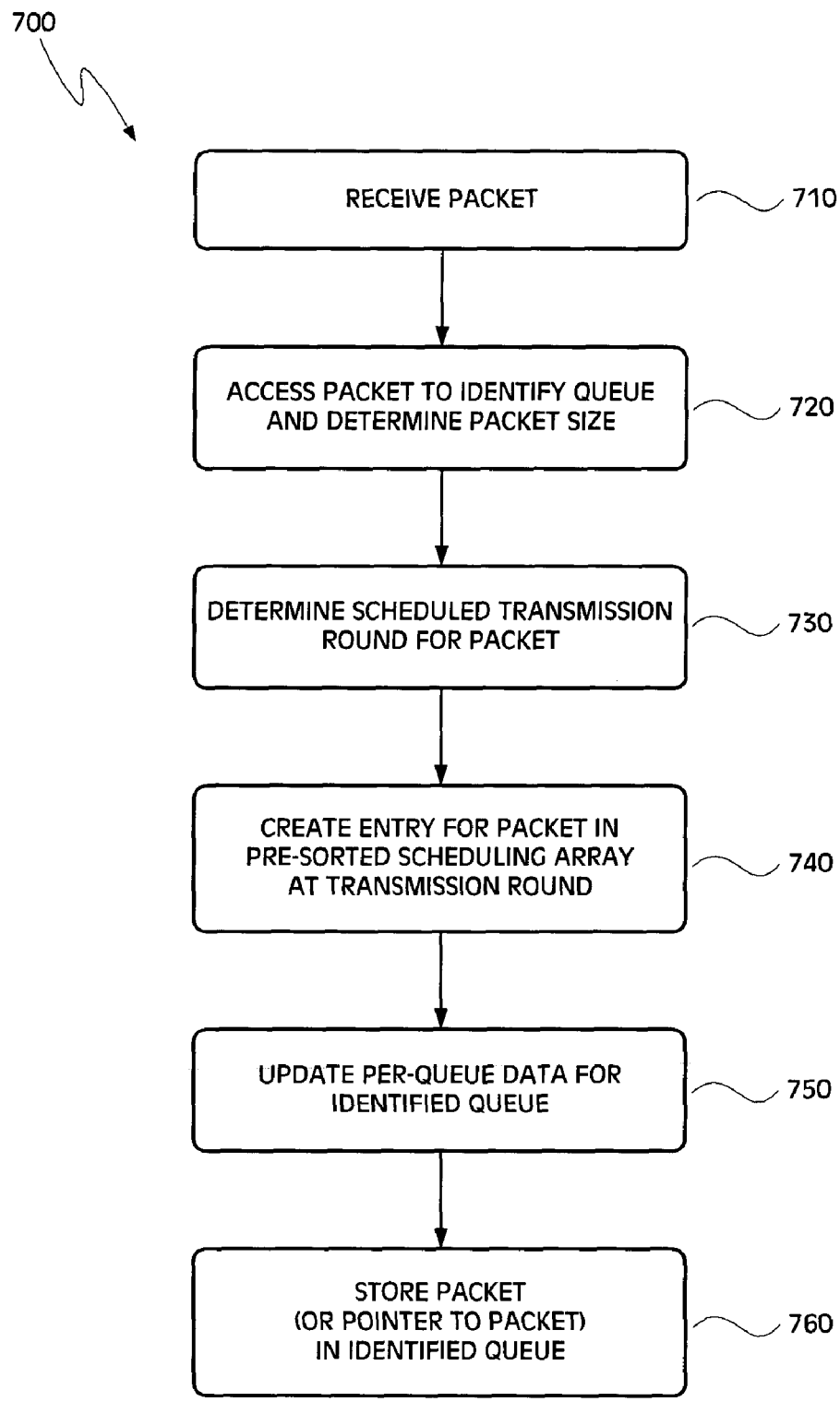
FIG. 7 is a block diagram illustrating an embodiment of a method of scheduling enqueued packets using a pre-sorted scheduling array, as may be performed by the packet scheduler of FIGS. 1-6.
Figure 8:
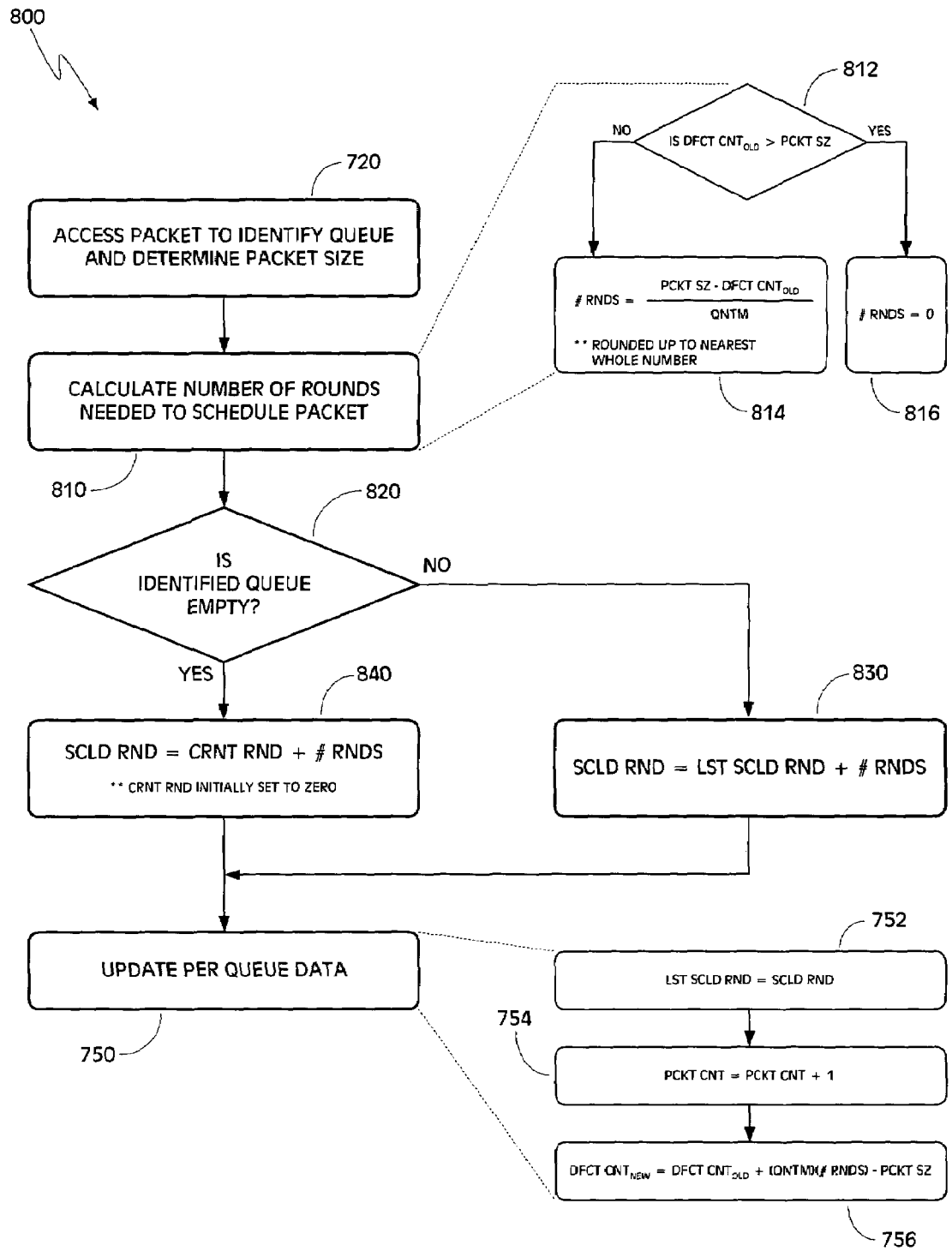
FIG. 8 is a block diagram illustrating an embodiment of a method of calculating a transmission round for a packet, as may be performed by the packet scheduler of FIGS. 1-6.

Illustrated in FIG. 7 is an embodiment of a method 700 for scheduling packets, as may be performed by packet scheduler 400. It should be understood, as suggested above, that the packet scheduling method set forth in FIG. 7 (and FIG. 8) is performed on a per-port basis. Referring now to block 710 in FIG. 7, a packet is received, and the received packet is accessed to identify the queue (and flow) with which the packet is associated and to determine the size of the packet, which is shown at block 720. As set forth at block 730, a transmission round for the packet is determined. An embodiment of a method 800 for determining the transmission round is illustrated and described below with respect to FIG. 8.

Once the transmission round for the received packet has been determined, an entry for the packet is created in one of the memory buffers of the pre-sorted scheduling array, as set forth at block 740. The entry is created in the memory buffer associated with the transmission round of the packet, and the entry will include an identifier for the packet (e.g., a pointer to a memory location of the packet). Referring to block 750, the per-queue data for the identified queue (i.e., the queue associated with the flow to which the packet belongs) is updated. As will be described below, the deficit count, packet count, and last scheduled round of the queue may be updated. As set forth at block 760, the received packet (or a pointer to the packet) is then stored in the identified queue. Thus, at the time the received packet has been enqueued and is awaiting transmission, that packet's scheduling time in some future transmission round has already been determined and, at the time of transmission, the packet will not need to be accessed.

As noted above, at block 730, a transmission round is determined for the received packet. Turning now to FIG. 8, illustrated is an embodiment of a method 800 for determining the transmission round of a packet. Referring to block 810 in FIG. 8, after the received packet has been accessed to identify the associated queue and packet size—see block 720—the number of rounds needed to schedule the packet is determined. In one embodiment, as set forth at blocks 812 through 816, if the deficit count is less than the packet size—see block 812—the number of rounds (# RNDS) is determined by subtracting the deficit count (DFCT CNT) from the packet size (PCKT SZ) and dividing that result by the quantum (QNTM) for the identified queue, wherein the final result is rounded up to the nearest whole number, which is set forth in block 814. However, as shown at block 816, where the deficit count exceeds the packet size, the number rounds needed to schedule the packet is zero (in other words, the queue still has sufficient allocated bandwidth remaining in the last scheduled round to schedule the current received packet).

Referring to block 820 in FIG. 8, if the identified queue contains one or more enqueued packets—i.e., the queue is not empty, as indicated by the packet count (PCKT CNT) for the identified queue—the scheduled transmission round (SCLD RND) for the packet equals the last scheduled round (LST SCLD RND) plus the previously calculated number of rounds (# RNDS). On the other hand, if the identified queue is empty, as indicated by a packet count of zero (see block 820), the scheduled transmission round equals the current round (CRNT RND) maintained by the scheduling agent 405 plus the calculated number of rounds. The current round corresponds to the round number of the memory buffer from which the scheduling agent is dequeuing packets for transmission. In other words, packets cannot be entered into the pre-sorted scheduling array at a round behind that which is presently being dequeued for the transmit process. Stated another way, packets should be scheduled ahead of the transmit process. Prior to commencement of transmit activities, the current round is initially set to zero.

The per-queue data is also updated after the scheduling of a packet, as noted above with respect to block 750. This is further illustrated in FIG. 8 in blocks 752 through 756. Referring to block 752, the last scheduled round (LST SCLD RND) is set equal to the scheduled transmission round (SCLD RND). As illustrated by block 754, the packet count (PCKT CNT) for the identified queue is updated by incrementing the packet count by one. Further, as set forth in block 756, an updated value for the deficit count (DFCT $CNT_{NEW}$) is determined by subtracting the packet size from the product of the quantum (QNTM) and the number of rounds (# RNDS), which result is then added to the previous deficit count (DFCT $CNT_{OLD}$).

Figure 9:
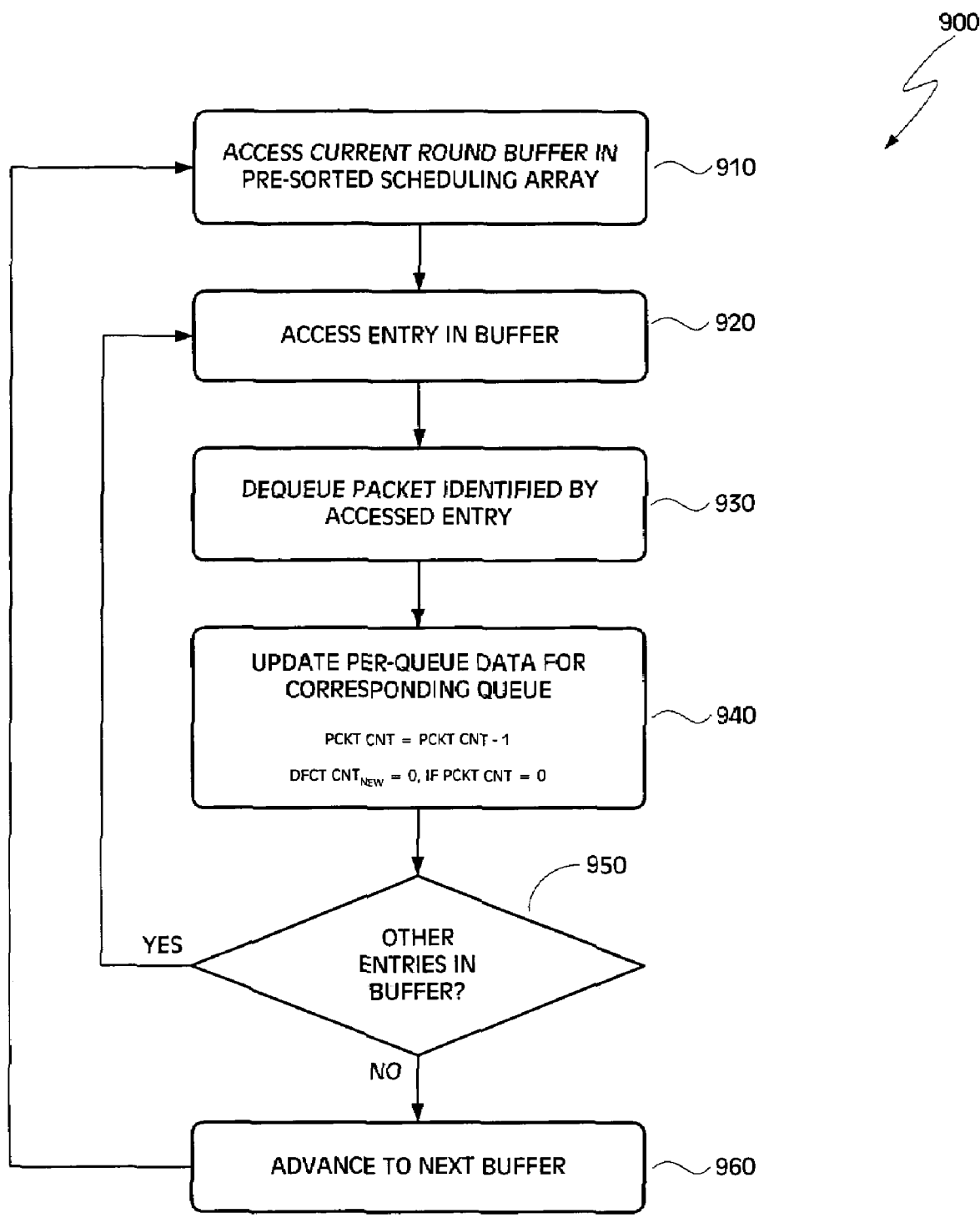
FIG. 9 is a block diagram illustrating an embodiment of a method of dequeuing packets for transmission using a pre-sorted scheduling array, as may be performed by the packet scheduler of FIGS. 1-6.

Illustrated in FIG. 9 is a method 900 of dequeuing packets from the pre-sorted scheduling array associated with any given port. Referring to block 910 in FIG. 9, the buffer of the pre-sorted scheduling array corresponding to the current round is accessed. As set forth at block 920, an entry of the current round buffer is accessed. Typically, for a FIFO type memory buffer, the "oldest" entry in the buffer will be accessed. The packet identified by the accessed entry of the current round buffer is then dequeued for transmission, as set forth at block 930. Referring to block 940, the per-queue data for the queue from which the packet has been dequeued is updated. Specifically, as shown in block 940, the packet count (PCKT CNT) of this queue is decremented by one. Also, if the queue is empty after dequeuing of the packet (i.e., the updated packet count equals zero), the deficit count (DFCT CNT$_{NEW}$) is, in one embodiment, set equal to zero. However, it is not required by the disclosed method to force the deficit count to zero when a queue becomes empty, and in another embodiment, a queue is allowed to "hold" on to its remaining deficit count when its packet count reaches zero.

Moving to block 950 in FIG. 9, if there are other entries for scheduled packets in the current round buffer, another entry is accessed and the above-described process (i.e., blocks 920, 930, and 940) is repeated. The packets scheduled for transmission in the current round buffer are dequeued for transmission, and when these scheduled packets have been dequeued—see block 960—the method advances to the next buffer. Generally, the current round will be incremented by one, and the next buffer will correspond to the buffer having a round number one higher than the previously accessed buffer. However, in another embodiment, empty buffers are skipped, and the method will advance to the next populated buffer, irrespective of its round number. After advancing to the next buffer, the above-described process (i.e., blocks 910, 920, 930, 940, and 950) is repeated to dequeue all packets from this buffer.

The packet scheduler 400 set forth with respect to FIGS. 1 through 6, as well as the methods 700, 800, 900 illustrated and described in FIGS. 7 through 9, respectively, may be better understood by the example set forth in FIGS. 10A-10H, which is now described. The example illustrated in FIGS. 10A-10H is based on a single port having three queues. It should, however, be understood that FIGS. 10A-10H present a simplified example including a small number of queues for ease of explanation and illustration. As will be appreciated by those of ordinary skill in the art, a network switch may, in practice, include hundreds, or even thousands, of queues per port.

Figure 10A:
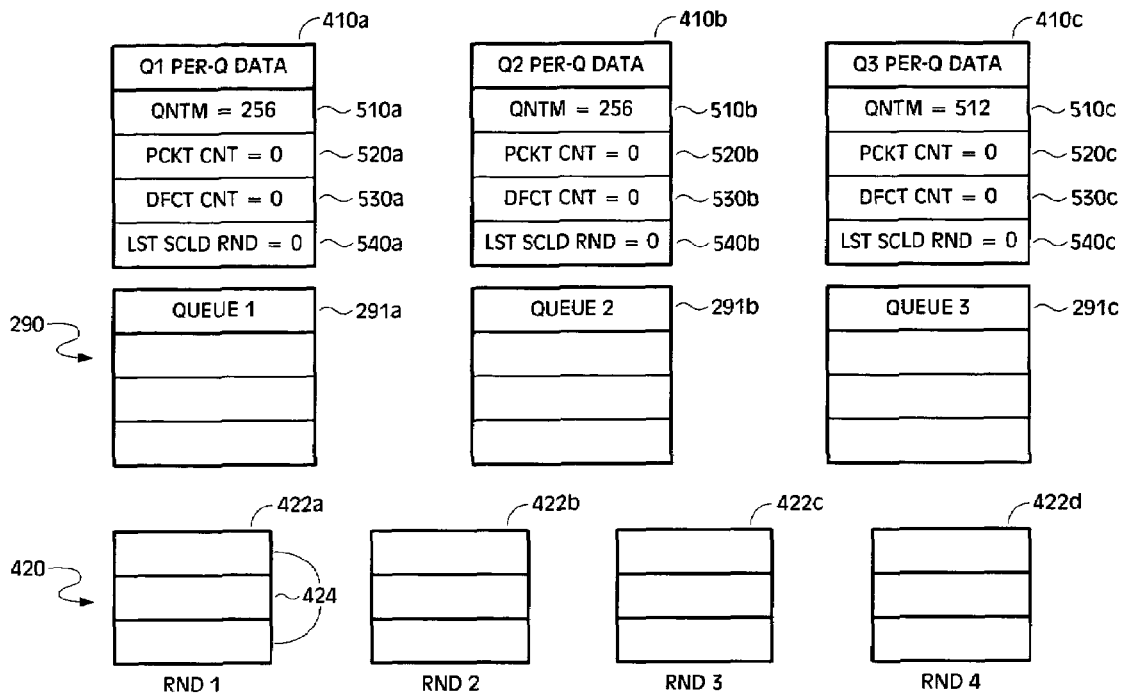
FIGS. 10A-10H are schematic diagrams illustrating an example of the methods of FIGS. 7 through 9.

Referring now to FIG. 10A, a port has three associated queues 291a, 291b, 291c (QUEUE 1, QUEUE 2, QUEUE 3), each queue having per-queue data 410a-c, respectively. The quantum for queues 291a, 291b is 256 bytes, whereas the quantum for queue 291c is 512 bytes. Initially, all other per-queue values (i.e., packet count, deficit count, and last scheduled round) are set equal to zero. The current round is also initially set equal to zero (i.e., transmission has not yet started). A pre-sorted scheduling array 420 includes a number of buffers 422, wherein buffers 422a-d corresponding to rounds one through four (RND 1-RND 4) are initially shown. All buffers 422a-d of the pre-sorted scheduling array are initially empty.

Figure 10B:
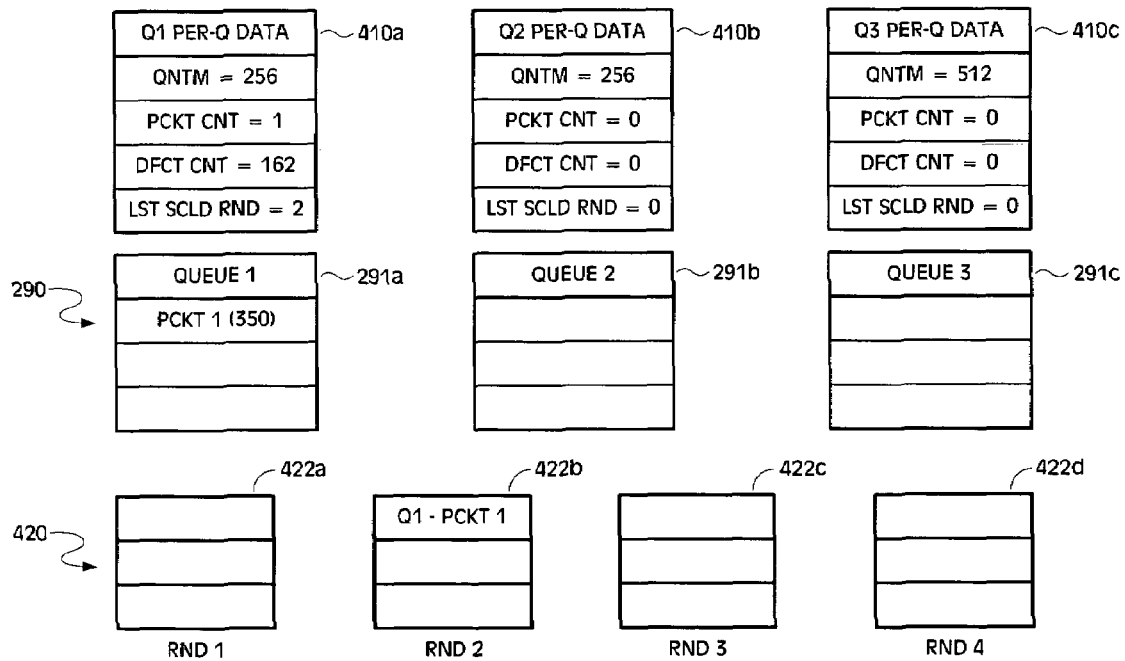

Turning to FIG. 10B, a first packet has been received. This packet is accessed (see FIG. 7, block 710), and it is found that the packet is associated with the first queue 291a and has a size of 350 bytes. To determine the scheduled transmission round for the first packet (see block 730), a number of rounds needed to schedule the packet is calculated (see blocks 810, 812, 814, and 816 in FIG. 8). Subtracting the deficit count (initially zero) from the packet size (350) and dividing by the quantum (256), and then rounding up to the nearest whole number, yields a value of two. Because the first queue is initially empty (see block 820), the scheduled transmission round equals the current round (initially zero) plus the calculated number of rounds (see block 840), which is two. An entry ("Q1-PCKT 1") for the first packet is then created in the second buffer 422b (RND 2) of the presorted scheduling array for the first packet (see block 740 in FIG. 7), which is shown in FIG. 10B. The per-queue data 410a for the first queue 291a is then updated (see blocks 750, 752, 754, and 756 in FIG. 8), such that the packet count is now one, the deficit count is now equal to 162, and the last scheduled round is equal to two, all as illustrated in FIG. 10B. The first packet is then enqueued to the first queue 291a, which is also shown in FIG. 10B.

Figure 10C:
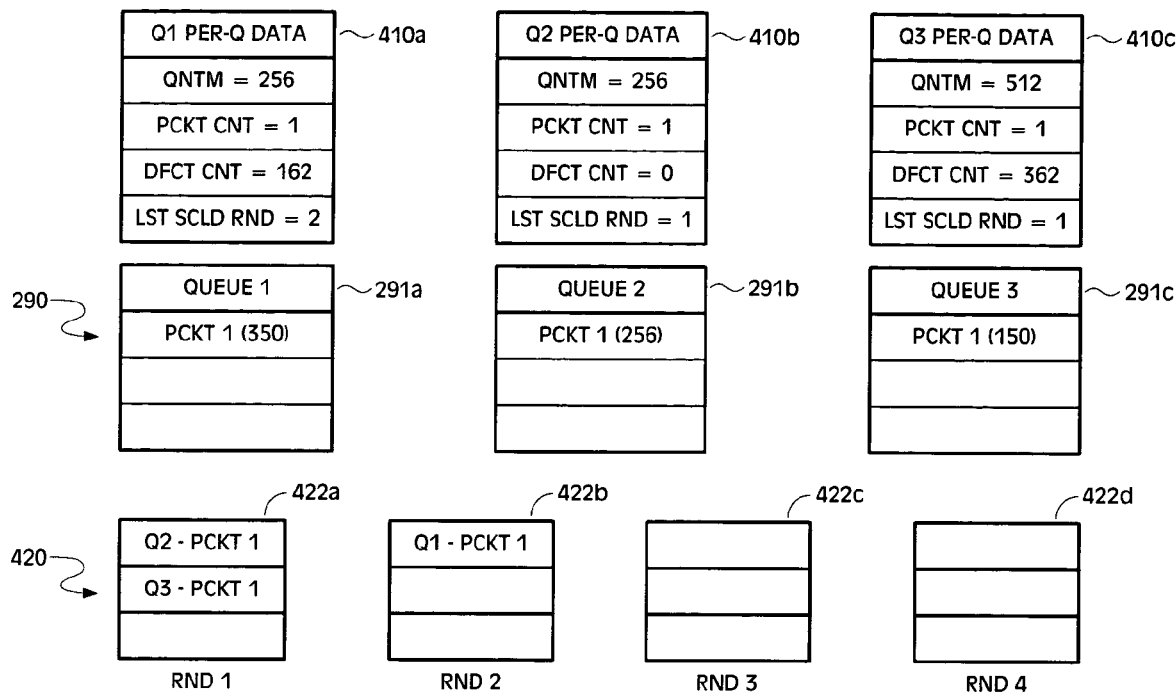

Referring next to FIG. 10C, another packet has been received, and this packet is found to belong to a flow associated with the second queue 291b and to have a size of 256 bytes (see block 720). Subtracting the deficit count for queue 291b (initially zero) from the packet size (256) and dividing by the quantum (256) yields a number of rounds equal to one (see blocks 810, 812, 814, 816). The second queue is initially empty, and the scheduled transmission round equals the current round (still zero) plus the calculated number of rounds, which was one (see block 820, 840). An entry ("Q2-PCKT 1") of this packet is then placed in the first buffer 422a of the presorted scheduling array 420 (see block 740), and the packet has been stored in the second queue 291b (see block 760), both as illustrated in FIG. 10B. The per-queue data 410b for second queue 291b is also updated (see blocks 750, 752, 754, 756), as shown in FIG. 10B (i.e., packet count equal to one, deficit count equal to zero, last scheduled round equal to one).

With continued reference to FIG. 10C, a third packet has been received, and this packet has a size of 150 bytes and is associated with the third queue 291c. The number of rounds necessary to schedule this packet is one, and an entry ("Q3-PCKT 1") is created in the fist buffer 422a of the pre-sort scheduling array 420, as shown in FIG. 10C. The per-queue data 410c for the third queue 291c is updated (i.e., packet count equal to one, deficit count equal to 362, and last scheduled round equal to one), and the packet is stored in the third queue 291c, all as illustrated in FIG. 1° C.

Figure 10D:
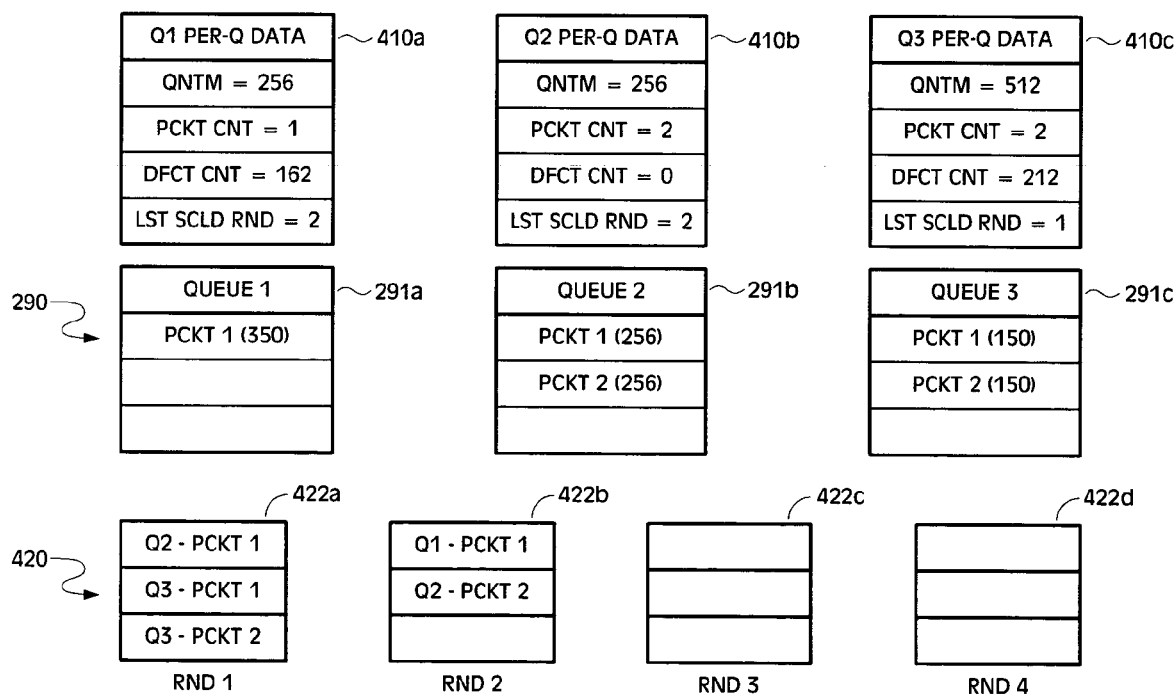

Turning now to FIG. 10D, another packet having a size of 256 bytes that is associated with the second queue 291b has been received. Performing the above-described process for determining the scheduled transmission round will yield a scheduled transmission round of two, and an entry ("Q2-PCKT 2") for this packet is placed in the second buffer 422b of the pre-sorted scheduling array 420. As further illustrated in FIG. 10D, an additional packet has been received that is associated with the third queue 291c. This packet has a size of 150 bytes. Note that the size of this packet (150) is less than the current deficit count (362) of the third queue (see FIG. 10C). Thus, the number of rounds needed to schedule this packet is zero (see blocks 812 and 816 in FIG. 8), and the scheduled transmission round is equal to the last scheduled round (see blocks 820 and 830). Accordingly, an entry ("Q3-PCKT 2") for this packet is placed in the first buffer 422a of the pre-sorted scheduling array 420, and multiple packets associated with the third queue 291c will be transmitted in the first scheduling round (RND 1). Also, the per-queue data 410c for the third queue 291c is again updated, as shown in FIG. 10D (packet count equal to two, deficit count now equal to 212, last scheduled round remaining at one).

Figure 10E:
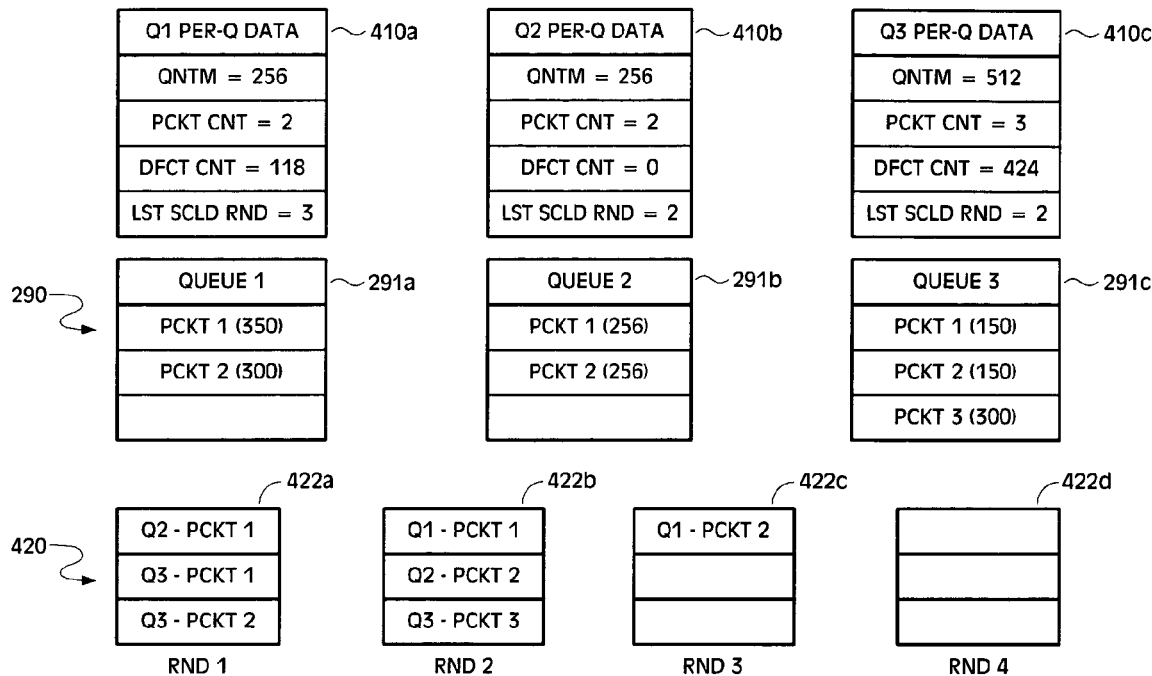

In FIG. 10E, two additional packets have been received, including a packet associated with the third queue 291c and having a size of 300 bytes, as well as a packet associate with the first queue and also having a size of 300 bytes. Note that the size (300) of the packet associated with the third queue 291c is greater than the remaining deficit count (212), and the scheduled transmission round is determined to be round two. Therefore, an entry ("Q3-PCKT 3") for this packet is created in the second buffer 422b of the presorted scheduling array, and the per-queued data 410c for the third queue 291c is updated, all as shown in FIG. 10E. The received packet associated with the first queue 291*a* can be scheduled for transmission in the third round—i.e., subtracting the deficit count (162) from the packet size (300) and dividing the result by the quantum (256) and rounding up to the nearest whole number yields the quantity one, which when added to the last scheduled round (2) for this queue yields a scheduled transmission round of three—and an entry ("Q1-PCKT 2") for this packet is placed in the third buffer 422*c* of pre-sorted scheduling array 420, as shown in FIG. 10E.

Figure 10F:
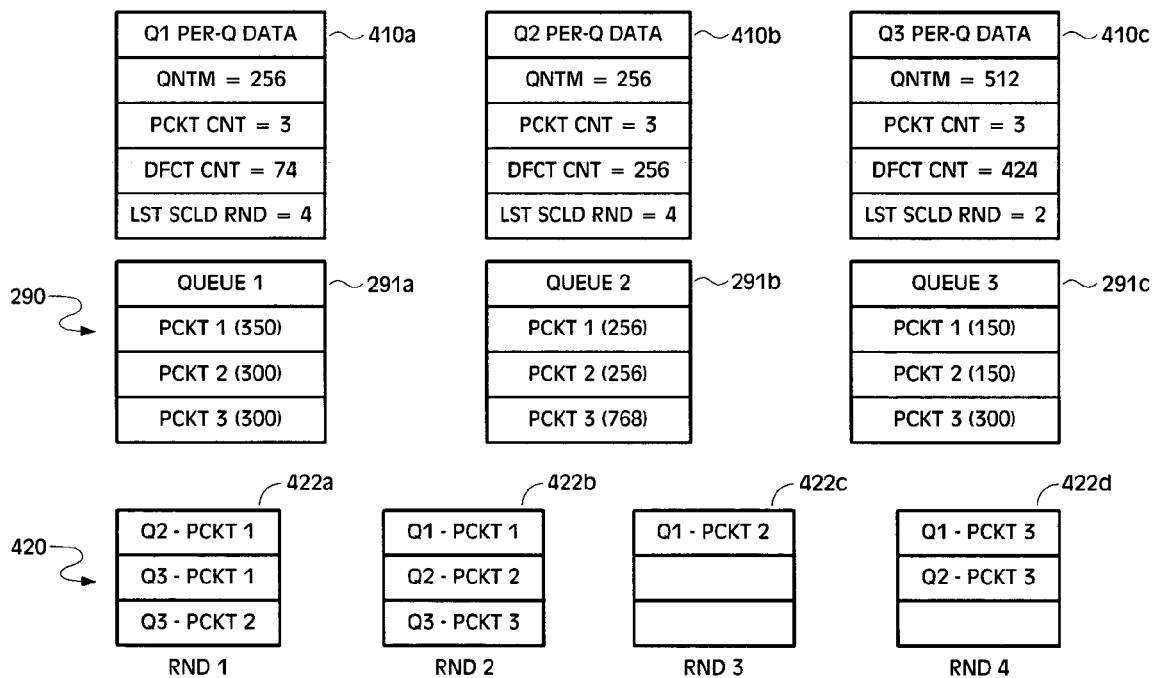

Referring now to FIG. 10F, another packet associated with the first queue 291*a* has been received. This packet has a size of 300 bytes. Applying the above-described procedure to determine a scheduled transmission round yields a transmission round of four, and an entry ("Q1-PCKT 3") for this packet is created in the fourth buffer 422*d* of the pre-sorted scheduling array 420. The per-queue data 410*a* for first queue 291*a* is also updated, as illustrated in FIG. 10F. Still referring to FIG. 10F, an additional packet associated with the second queue 291*b* has been received, this packet having a size of 768 bytes. Once again, applying the above-described procedure, it is found that the number of rounds needed to schedule this packet is two, which is added to the last scheduled round (2) for the second queue, thereby resulting in a scheduled transmission round of four. Accordingly, an entry ("Q2-PCKT 3") is created in the fourth buffer 422*d* of pre-sorted scheduling array 420, and the per-queue data 420*b* for second queue 291*b* is updated, as shown in FIG. 10F.

Figure 10G:
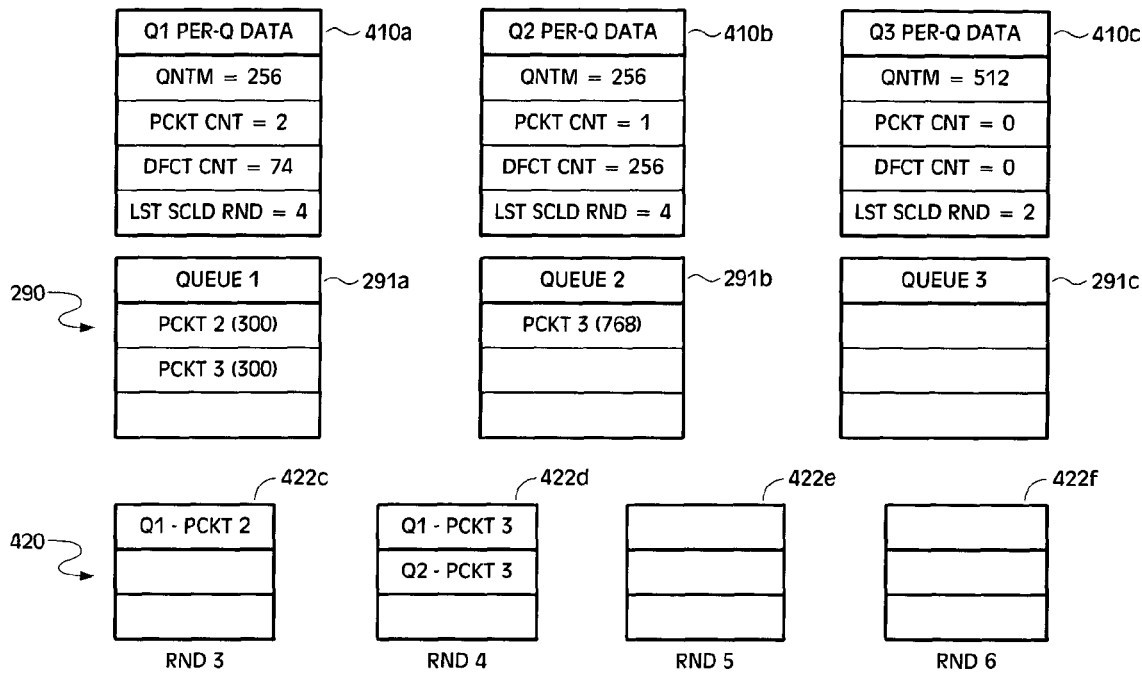

With reference to both FIGS. 10F and 10G, the scheduling agent 405 has commenced dequeuing of packets. The packets in the first buffer 422*a* (i.e., the RND 1 buffer) of the pre-sorted scheduling array 420 have been dequeued (see FIG. 9, blocks 910 through 950). The dequeue process has advanced to the next buffer (see block 960), which is the RND 2 buffer 422*b*, and the packet stored in this buffer have also been dequeued. Thus, in FIG. 10G, packets remain in only the third and fourth buffers 422*c*, 422*d* of the pre-sorted scheduling array 420, and the current round now equals two (although all packets have been dequeued from the RND 2 buffer, dequeuing from the third buffer has not yet started). In FIG. 10G (and FIG. 10H), the first and second buffers 422*a*, 422*b* are no longer shown, but a fifth buffer 422*e* (RND 5) and a sixth buffer 422*f* (RND 6) are now shown. Also, the per-queue data 410*a-c* for the queues 291*a-c* has been updated (see FIG. 9, block 940).

Figure 10H:
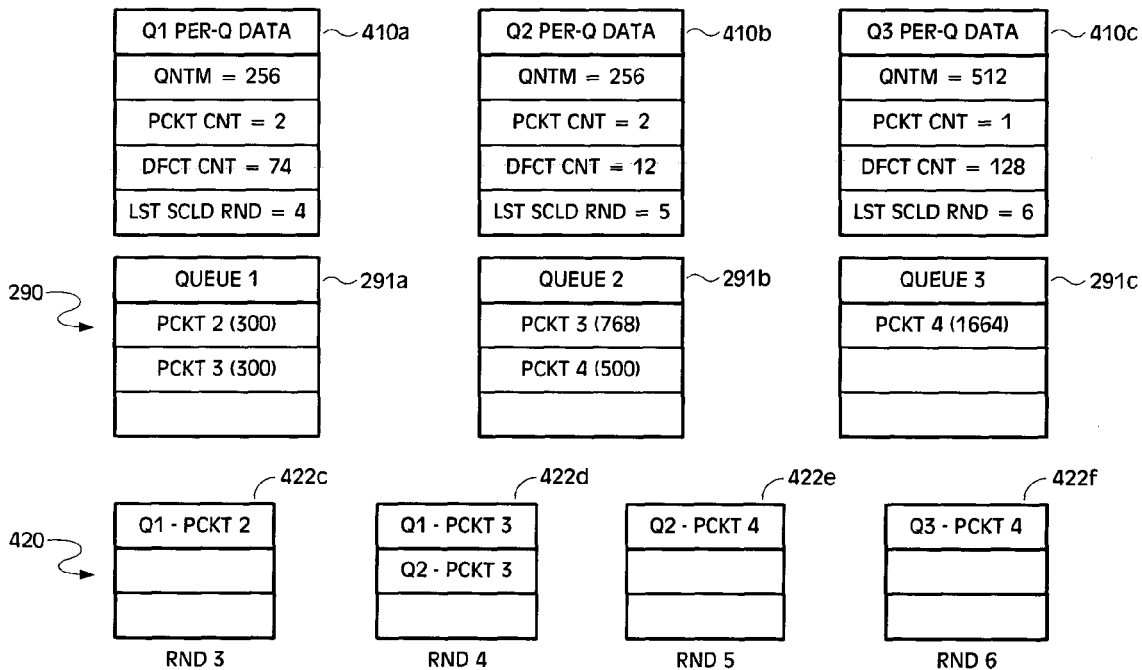

Turning now to FIG. 10H, another packet associated with the third queue has been received. This packet has a size of 1664 bytes. Because the third queue 291*c* became empty after the first and second rounds of dequeuing, the deficit count of the third queue was reset to zero (see FIG. 10G). Dividing the packet size by the quantum yields a number of rounds required for scheduling of four. Because the third queue 291*c* is currently empty (see blocks 820 and 840 in FIG. 8), this number is added to the current round (2) to determine the scheduled transmission round for this packet, which yields a scheduled transmission round of six. Accordingly, an entry ("Q3-PCKT 4") is entered into the sixth buffer 422*f* of the pre-sorted scheduling array, as shown in FIG. 10H. The packet is stored in the third queue, and the per-queue data 410*c* for this queue is updated, as also shown in FIG. 110H. Still referring to FIG. 110H, an additional packet associated with the second queue 291*b* has been received, this packet having a size of 500 bytes. Based on the current deficit count, the last scheduled round, and the quantum for this queue, the scheduled transmission round is determined to be round five, and an entry ("Q2-PCKT 4") for this packet is created in the fifth buffer 422*e* of pre-sorted scheduling array 420, as shown in FIG. 10H. The packet is stored in the second queue 291*b*, and the per-queue data 410*b* of this queue updated, which is also shown in this figure. Additional enqueues with scheduling entries made in the pre-sorted scheduling array, as well as additional dequeues, would be processed in a similar manner.

From the simple example illustrated in FIGS. 10A-10H, as well as from the embodiments disclosed in FIGS. 1 through 9, the advantages of the disclosed embodiments will be apparent to those of ordinary skill in the art. Scheduling a packet for transmission is simply a matter of dequeuing the packet from the current round buffer of a pre-sorted scheduling array. Scheduling calculations can be performed when a packet is enqueued, and no calculations are performed when a packet is being transmitted. Thus, computational work expended on packets that cannot be transmitted (i.e., because the packet at the head of a queue exceeded the current deficit count in a given round), as may occur with conventional DRR schemes, is avoided. Accordingly, by forecasting future transmission rounds at the time of packet enqueuing, and storing scheduling entries in a pre-sorted scheduling array, efficiency and throughput are increased, which is desirable for high performance applications.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   accessing a received packet to determine a size of the packet and a queue associated with the packet;
   determining a transmission round for the packet based, at least in part, on the size of the packet and a quantum for the associated queue; and
   creating an entry in a scheduling array for the packet, the entry placed at a position in the scheduling array corresponding to the transmission round, wherein determining a transmission round comprises:
   determining a number of rounds needed to schedule the packet;
   if the associated queue has a previously enqueued packet, setting the transmission round equal to a sum of a last scheduled round and the number of needed rounds; and
   if the associated queue is empty, setting the transmission round equal to a sum of a current round and the number of needed rounds.

2. The method of claim 1, further comprising updating data for the associated queue.

3. The method of claim 2, wherein the data for the associated queue includes a packet count, a deficient count, and the last scheduled round.

4. The method of claim 2, wherein updating the data comprises:
   setting the last scheduled round equal to the transmission round;
   incrementing the packet count; and
   determining a new value of the deficit count based, at least in part, on an old value of the deficit count.

5. The method of claim 4, wherein determining the new value for the deficient count comprises:
   determining a product of the quantum and the number of needed rounds;

determining a sum of the product and the old value of the deficit count; and subtracting the packet size from the sum.

6. The method of claim 4, wherein determining a number of rounds needed to schedule the packet comprises:

if the old value of the deficit count exceeds the packet size, setting the number of needed rounds equal to zero; and if the old value of the deficit count is less than the packet size, subtracting the old value of the deficit count from the packet size to determine a result, and dividing the result by the quantum to determine the number of needed rounds.

7. The method of claim 1, further comprising storing a pointer for the packet in the associated queue, the pointer identifying a memory location of the packet.

8. The method of claim 7, further comprising dequeuing the packet from the associated queue.

9. The method of claim 8, wherein the associated queue comprises one of a number of queues and the number of queues is associated with one of a number of ports of a switching device.

10. The method of claim 8, further comprising updating data for the associated queue.

11. The method of claim 10, wherein updating the data for the associated queue comprises:

decrementing a packet count; and setting a deficit count equal to zero.

12. A method comprising:

providing a first data structure, the first data structure having a number of corresponding buffers, each of the buffers corresponding to a round;

providing a second data structure, the second data structure including data for each of a number of queues, the data for each queue including a deficit count;

storing the first and second data structures in a storage device;

determining a number of rounds based on a size of a received packet, a quantum for the one queue, and a deficit count associated with the one queue; and determining a transmission round for a received packet based on the number of rounds, wherein the transmission round is based upon a last scheduled round associated with the one queue.

13. The method of claim 12, wherein the second data structure includes a quantum for each of the queues.

14. The method of claim 12, further comprising accessing the received packet to determine a size of the packet and a flow to which the packet belongs, the flow associated with one of the queues.

15. The method of claim 12, wherein the transmission round is further based upon a current round associated with a transmission process.

16. The method of claim 12, further comprising updating the data in the second data structure corresponding to the one queue.

17. The method of claim 16, wherein updating the data comprises:

updating a last scheduled round for the one queue;

updating a packet count for the one queue; and updating the deficit count for the one queue.

18. The method of claim 12, further comprising placing an entry for the packet in one of the buffers of the first data structure, the round of the one buffer corresponding to the transmission round of the packet.

19. The method of claim 18, further comprising dequeuing the packet from the one queue when a current round of a dequeue process equals the round of the one buffer.

20. The method of claim 12, wherein each of the first and second data structures and the number of queues are associated with one of a number of ports of a switching device.

21. An apparatus comprising:

a number of ports;

a memory system having stored therein a number of queues associated with one of the ports;

a first data structure associated with the one port, the first data structure having a number of corresponding buffers, each of the buffers corresponding to a round, and a second data structure associated with the one port, the second data structure including data for each of the queues, the data for each queue including a quantum and a deficit count; and a processing device coupled with the memory system, wherein the processing device is coupled with a memory having a set of instructions stored therein, wherein the set of instructions, when executed on the processing device, causes:

determination of a number of rounds based on the size of a received packet, the quantum for the one queue, and the deficit count associated with the one queue;

determination of a transmission round based, at least in part, on the number of rounds; and dequeuing of the packet from the one queue when a current round equals the round of the one buffer, the dequeued packet provided to the one port for transmission.

22. The apparatus of claim 21, wherein the set of instructions, when executed on the processing device, causes:

accessing of the received packet to determine a size of the packet and a flow to which the packet belongs, the flow associated with one of the queues.

23. The apparatus of claim 21, wherein the set of instruction, when executed on the processing device, causes placement of an entry for the packet in one of the buffers of the first data structure, the round of the one buffer corresponding to the transmission round of the packet.

24. The apparatus of claim 21, wherein the memory coupled with the processing device comprises on-chip memory.

25. The apparatus of claim 24, wherein the on-chip memory is associated with one of a number of processing engines of the processing device.

26. The apparatus of claim 21, wherein the processing device comprises a network processor coupled with the memory system, the network processor including a number of processing engines, each of the processing engines coupled with a memory.

27. The apparatus of claim 26, wherein the set of instructions is stored in the memory associated with one of the processing engines.

28. The apparatus of claim 27, wherein a second set of instructions is stored in the memory associated with a second of the processing engines, the second set of instructions for performing another operation and executable in parallel with the set of instructions.

29. The apparatus of claim 27, wherein the set of instructions is stored in the memory associated with a second of the processing engines, the second processing engine capable of executing the set of instruction in parallel with the one processing engine.

30. The apparatus of claim 27, wherein the set of instructions is distributed across at least two of the processing engines.

31. The apparatus of claim 26, wherein the memories associated with each of at least a subset of the processing engines comprise a single memory shared by the subset.

32. An apparatus comprising:
a number of ports;
a static random access memory (SRAM) having stored therein a number of queues associated with one of the ports;
a scheduling array associated with the one port, the scheduling array including a number of buffers, each of the buffers corresponding to a round, and per-queue data for each of the queues associated with the one port, the per-queue data for each queue including a quantum and a deficit count; and
a processing device coupled with the SRAM, wherein the processing device is coupled with a memory having a set of instructions stored therein, wherein the set of instructions, when executed on the processing device, causes:
determination of a number of rounds based on the size of a received packet, the quantum for the one queue, and the deficit count associated with the one queue;
determination of a transmission round based, at least in part, on the number of rounds; and
dequeuing of the packet from the one queue when a current round equals the round of the one buffer, the dequeued packet provided to the one port for transmission.

33. The apparatus of claim 32, wherein the set of instructions, when executed on the processing device, causes:
accessing of the received packet to determine a size of the packet and a flow to which the packet belongs, the flow associated with one of the queues.

34. The apparatus of claim 32, wherein the set of instruction, when executed on the processing device, causes placement of an entry for the packet in one of the buffers of the scheduling array, the round of the one buffer corresponding to the transmission round of the packet.

35. The apparatus of claim 32, wherein the memory coupled with the processing device comprises on-chip memory.

36. The apparatus of claim 35, wherein the on-chip memory is associated with one of a number of processing engines of the processing device.

37. The apparatus of claim 36, wherein the on-chip memory associated with the one processing engine comprises a SRAM.

38. An article of manufacture comprising:
a machine accessible medium providing instructions that, when accessed by a machine, causes the machine to
access a received packet to determine a size of the packet and a queue associated with the packet;
determine a transmission round for the packet based, at least in part, on the size of the packet and a quantum for the associated queue;
create an entry in a scheduling array for the packet, the entry placed at a position in the scheduling array corresponding to the transmission round; and
when determining a transmission round, to:
determine a number of rounds needed to schedule the packet;
if the associated queue has a previously enqueued packet, set the transmission round equal to a sum of a last scheduled round and the number of needed rounds; and
if the associated queue is empty, set the transmission round equal to a sum of a current round and the number of needed rounds.

39. The article of manufacture of claim 38, wherein the instructions, when accessed, further causes the machine to update data for the associated queue.

40. The article of manufacture of claim 39, wherein the data for the associated queue includes a packet count, a deficient count, and the last scheduled round.

41. The article of manufacture of claim 39, wherein the instructions, when accessed, further causes the machine, when updating the data, to:
set the last scheduled round equal to the transmission round;
increment the packet count; and
determine a new value of the deficit count based, at least in part, on an old value of the deficit count.

42. The article of manufacture of claim 41, wherein the instructions, when accessed, further causes the machine, when determining the new value for the deficient count, to:
determine a product of the quantum and the number of needed rounds;
determine a sum of the product and the old value of the deficit count; and
subtract the packet size from the sum.

43. The article of manufacture of claim 41, wherein the instructions, when accessed, further causes the machine, when determining a number of rounds needed to schedule the packet, to:
if the old value of the deficit count exceeds the packet size, set the number of needed rounds equal to zero; and
if the old value of the deficit count is less than the packet size, subtract the old value of the deficit count from the packet size to determine a result, and divide the result by the quantum to determine the number of needed rounds.

44. The article of manufacture of claim 38, wherein the instructions, when accessed, further causes the machine to store a pointer for the packet in the associated queue, the pointer identifying a memory location of the packet.

45. The article of manufacture of claim 44, wherein the instructions, when accessed, further causes the machine to dequeue the packet from the associated queue.

46. The article of manufacture of claim 45, wherein the associated queue comprises one of a number of queues and the number of queues is associated with one of a number of ports of a switching device.

47. The article of manufacture of claim 45, wherein the instructions, when accessed, further causes the machine to update data for the associated queue.

48. The article of manufacture of claim 47, wherein the instructions, when accessed, further causes the machine, when updating the data for the associated queue, to:
decrement a packet count; and
set a deficit count equal to zero.

* * * * *